United States Patent [19]
Gasper

[11] Patent Number: 4,884,972
[45] Date of Patent: Dec. 5, 1989

[54] SPEECH SYNCHRONIZED ANIMATION

[75] Inventor: Elon Gasper, Garberville, Calif.

[73] Assignee: Bright Star Technology, Inc., Bellevue, Wash.

[21] Appl. No.: 935,298

[22] Filed: Nov. 26, 1986

[51] Int. Cl.⁴ .............................................. G09B 19/04
[52] U.S. Cl. ...................................... 434/185; 434/169
[58] Field of Search ................ 434/167, 169, 172, 185

[56] References Cited

U.S. PATENT DOCUMENTS

| | | | |
|---|---|---|---|
| 660,255 | 10/1900 | Kingma | 434/185 |
| 4,460,342 | 7/1984 | Mills | 434/185 |

FOREIGN PATENT DOCUMENTS

| | | | |
|---|---|---|---|
| 1129640 | 8/1982 | Canada | 434/185 |
| 2121587 | 12/1983 | United Kingdom | 434/185 |

*Primary Examiner*—Leo P. Picard
*Attorney, Agent, or Firm*—Schroeder, Davis & Orliss, Inc.

[57] ABSTRACT

A system for providing randomly-accessible animated objects having synchronous audio and visual features suitable for use as an education system or video entertainment system is provided. The speech sounds and the associated visual and behavioral characteristics of language are broken into their constituent parts to produce encoded communication patterns and characteristics associated with speech. In response to coded input signal representing speech sounds or combinations of a speechsounds forming words, a coded model is constructed including a voice and animated visual image having synchronized audio and associated visual characteristics to speak the sound or words which were input. A user is presented with a viewing screen having several rows of what are perceived to be domino-like tiles each inscribed with one or more letters. An animated character including a talking head is also displayed on the screen. The user selects tiles with a mouse or other input device and moves the tiles about the screen to form words or other combinations of letters. As a tile is selected, the animated character pronounces the name and sound of the letter inscribed on the tile. When words are formed, the animated character pronounces the words or the sound of the character combinations formed.

33 Claims, 21 Drawing Sheets

| Entry | data sequence |
|---|---|
| 1: | 10 , 43 |
| 2: | 10 , 43 |
| 3: | 2 , 101 , 2 , 127 , 2 , 102 , 2 , 126 |
| 4: | 20 , 55 , 1 , 1 |

```
601 —— /* elf model : legalos */
608 —— DEFINE READER 6 \ $  /* use \ as string terminator & end of rules, $ as space*/
622 —— METHOD=ENGLISHNAL   /* use modified NAL (Elovitz) English method */

/* phonetics rule          orthophonetic rules    */

[A]=AE\           3:(1 1 4), 6:(1 1) ; /*short a rule, underline and dot*/
        [E]=EH\           3:(1 1 4), 6:(1 1) ; /* short a rule */
603     [IGH]=AY\         3:(3 1 4), 6:(1 1)(2 0) ; /* just sound & dot the i*/
        $[KN]=N\          3:(2 1 4), 6:(1 0)(1 1) ; /* silent k b4 n, beg of wrd*/
        [K]=K\       607  3:(1 1 4), 6:(1 1) ; /* k rule, underline and dot it */
605 —— $[ONE]$=WAHN\      1:(3 3 2), 3:(3 3 4) ; /* example of an exception word */
        [OUGH]=AHF\   609 3:(2 1 4)(2 1 4), 6:(1 0)(1 1)(2 1) ; /* silent o, gh=f*/
        [T]=T\            3:(1 1 4), 6:(1 1) ; /* easy one, t=t, underline & dot */
        [W]=W\            3:(1 1 4), 6:(1 1) ; /* one letter makes one phoneme */
        [X]=KS\           3:(1 2 4), 6:(1 2) ; /* one letter makes two phonemes */
610 —— [$]=$\             3:(1 0 4), 6:(1 0) ; /* space : no OPS phocodes gen'ed*/

\   /* end of rules for reader 6 */

611 —— MODEL 6
612 —— USE NARRATOR 6
613 —— USE READER 6
                    —614
        "1" "#" STRESS 1
        "2" "#" STRESS 2
        "3" "#" STRESS 3
        "4" "#" STRESS 4
        "5" "#" STRESS 5
        "6" "#" STRESS 6
        "7" "#" STRESS 7
        "8" "#" STRESS 8
        "9" "#" STRESS 9
615     "*" "#"
        "." "#" BREAK
        "?" "#" BREAK
        "-" "#" PAUSE 3
        "," "#" PAUSE 3
        "(" "#"
        ")" "#"
        " " "#"
        ";" "#"
```

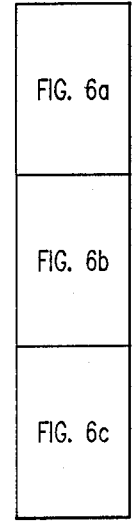

KEY TO FIG. 6

FIG. 6a

619 "AA" "AA #" VOWEL EVENT OPS 10 2 ←621
"AE" "AE #" VOWEL EVENT OPS 9 3
"AH" "AH #" VOWEL EVENT OPS 10 4
"AO" "AO #" VOWEL EVENT OPS 10 5
625 "AW" "AW #" VOWEL EVENT OPS 5 6 5 48
"AX" "AX #" VOWEL EVENT OPS 10 7
"AY" "AY #" VOWEL EVENT OPS 12 8
"EH" "EH #" VOWEL EVENT OPS 10 9
"ER" "ER #" VOWEL EVENT OPS 8 10
"EY" "EY #" VOWEL EVENT OPS 10 11
617 "IH" "IH #" VOWEL EVENT OPS 8 12
"IL" "IL #" EVENT OPS 10 1
"IM" "IM #" EVENT OPS 12 1
"IN" "IN #" EVENT OPS 12 1
"IX" "IX #" VOWEL EVENT OPS 10 13
"IY" "IY #" VOWEL EVENT OPS 10 14
"OH" "OH #" VOWEL EVENT OPS 10 15
"OW" "OW #" VOWEL EVENT OPS 10 16
"OY" "OY #" VOWEL EVENT OPS 5 6 5 49
"UH" "UH #" VOWEL EVENT OPS 10 16
"UL" "UL #" EVENT OPS 5 18 5 27
"UM" "UM #" EVENT OPS 5 18 5 28
"UN" "UN #" EVENT OPS 5 18 5 29
"UW" "UW #" VOWEL EVENT OPS 10 19
"UX" "UX #" VOWEL OPS 10 19
626 "B" "BAX #" EVENT OPS 10 20
"CH" "CHAX #" EVENT OPS 10 21
"D" "DAX #" EVENT OPS 10 22
"DH" "DHAX #" EVENT OPS 10 40
627 "DX" "DX #" EVENT OPS 1 44
"J" "JAX #" EVENT OPS 10 25
631 "K" "KAX #" OPS 7 26        /* not event - for example */
"L" "LXLX #" EVENT OPS 10 27
"M" "MMM #" EVENT OPS 10 28
"N" "NN #" EVENT OPS 10 29
"NX" "NNQXGAX #" EVENT OPS 9 38

FIG. 6b

```
        "R" "RR #" EVENT OPS 10 31
        "RX" "R #" EVENT OPS 10 46
        "S" "SS #" OPS 4 32          /* not event - for example */
633──── "SH" "SH #" EVENT OPS 10 41
        "T" "TUH #" EVENT OPS 10 33
        "TH" "THAX #" EVENT OPS 10 39
        "V" "VAX #" EVENT OPS 10 34
 627    "W" "WUH #" EVENT OPS 5 35 5 50
        "Y" "YAX #" EVENT OPS 10 36
        "Z" "ZZZ #" EVENT OPS 10 37
        "ZH" "ZHAX #" EVENT OPS 10 42
        "F" "FAX #" EVENT OPS 10 23
        "G" "_GAX #" EVENT OPS 10 24  /* use a digitized sound file */
629──── "Q" "Q #" EVENT OPS 1 33
        "QX" "QX #" EVENT OPS 1 1
        "/C" "/CAX #" EVENT OPS 10 43
        "/H" "/HAX #" EVENT OPS 10 43
        "**" "SS #" 2 101 2 127 2 102 2 126 2 103 1 97 /* turn to face us*/
        "*1" "SS #" 20 55 1 1      /* stick out yo tongue */
 635    "*2" "SS #" 1 103 1 126 1 102 1 127 1 101 1 1  /* turn back to profile, qck*/
        "*7" "SS #" 9 69 8 1 7 69 1 1    /* blink from side */
        "=2" "SS #" 10 30 25 39  /* eye up */
        "=3" "SS #" 10 30 25 39  /* eye middle */
636──── "=4" "SS #" 10 30 25 39  /* eye down */
637────     ;           ╲634

SPECPAAAMS 1 1 1 1 ;

638────INBETWEEN 33 5 65 3 ;  /* in between t (position 33) and AO (position 5) put
                                  position 65 for 3 cycles */

INBETWEEN 5 26 68 2 ;
       INBETWEEN 26 12 66 2 ;
 639   INBETWEEN 12 38 67 2 ;
       INBETWEEN 33 8 60 2 ;
       INBETWEEN 8 37 61 2 ;

640────INBETWEEN 33 2 65 2 ;  /* use inbetween position 65 over again example: in this
                                  case it goes between t (position 33) and AA (position 2) */

642────INBETWEEN 33 1 71 3 ;  /* between any adjacent t (position 33) and
                                  atrest (position 1) put position 71 for 3 cycles */

641────INBETWEEN 33 71 74 2 ; /* nested inbetween example: between any adjacent
                                  33 and 71 put position 74 for 2 cycles */

623────ENDMODEL "elf . img"

643────  ;            FIG. 6c
```

701 — SPEAKER 6
703 — LETTER NAMES
"A" "EY #"
"B" "BIY #"
"C" "SIY #"
"D" "DIY #"
"E" "IY #"
"F" "EHF #"
"G" "JIY #"
"H" "EYCH #"
"I" "AY #"
"J" "JEY #"
"K" "KEY #"
"L" "EHL #"
"M" "EHM #"
"N" "EHN #"
"O" "OH #"
"P" "PIY #"
"Q" "KYUW #"
"R" "RRRX #"
"S" "EHS #"
"T" "TIY #"
"U" "YUW #"
"V" "VIY #"
"W" "_DUHBAXLYUW #"
"X" "EHKS #"
"Y" "WAY #"
"Z" "ZIY #"
;

KEY TO FIG. 7

```
       MARGINS TOP    4
705          LEFT   5
             BOTTOM 5
             RIGHT  4 ;
707  FONT STYLE 92
          FACE 1

SIZE 18 ;
709  MAGNET RANGE  10
711  SQUISH FACTOR  3
713  SCOOT SPEED    8 25
715  GAP 10

717  TRAY "test 1"
       AT 0 0 107 511 ;

TILE IN TRAY "test 1"
719    AT 30 35 0 0
721    SHOW "A"
723    SAY "AE #"
724    WORDALSO /* there is also a (one-letter) word same as this tray tile A */
725    PRESS 10 56 56 56 56 56 ;

TILE IN TRAY "test 1"
         AT 0 0 0 0
         SHOW "B"
         SAY "BAH #"
         PRESS 11 56 56 56 56 56 ;

726    TILE IN TRAY "test 1"
         AT 0 0 0 0
         SHOW "C"
727    SAY " KAH"
         PRESS 12 56 56 56 56 56 ;
729

TILE IN TRAY "test 1"
         AT 0 200 0 0
         SHOW "D"
         SAY "DAH #"
         PRESS 13 56 56 56 56 56 ;
```

FIG. 7b

| RULES 901 | ORIGINAL TEXT | PHONETIC TRANSLATION 902 | OPS PHOCODE COUNT 904 | # OF CHARACTERS | # OF OPS PHOCODES | PARAMETER | # OF CHARACTERS | # OF OPS PHOCODES MAPPED TO | DISPLAYED ANIMATION 912 | SOUND 914 |
|---|---|---|---|---|---|---|---|---|---|---|
| $[KN]=N\ 3:(214), 6:(10)(11) ; | KN | N | 1 | 2 | 1 | 4 | 1 | 0 | K̇NIGHT AX | "N" |
| [IGH]=AY\ 3:(314), 6:(11)(20) ; | IGH | AY | 2 | 3 | 1 | 4 | 1 | 1 | KNIGHT AX | "AY" |
| [T]=T\ 3:(114), 6:(11) ; | T | T | 3 | 1 | 1 | 4 | 1 | 1 | KNIGḢT AX | "T" |
| [$]=$\ 3:(104), 6:(10) ; | SPACE | SPACE | 4 | 1 | 0 | 4 | 2 | 0 | KNIGHṪ AX | |
| [A]=AE\ 3:(114), 6:(11) ; | A | AE | 5 | 1 | 1 | 4 | 1 | 1 | KNIGHT ȦX | "AE" |
| [X]=KS\ 3:(124), 6:(12) ; | X | K | 6 | 1 | 2 | 4 | 1 | 1 | KNIGHT AẊ | "K" |
| | | S | | | | | | 2 | KNIGHT AẊ | "S" |

FIG. 9

SPEECH SYNCHRONIZED ANIMATION

BACKGROUND OF THE INVENTION

The present invention relates generally to educational methods utilizing computer generated image-sound synchronization, and, more specifically to a method and apparatus for the decomposition of a person's or animated character's body images and sounds corresponding to an act into constituent parts and then recombining the constituent parts into the body images and sounds of that person or animated character performing a different, unrelated act.

It is well-known in the prior art to provide video entertainment or teaching tools employing time synchronized sequences of pre-recorded video and audio. The prior art is best exemplified by tracing the history of the motion picture and entertainment industry from the development of the "talkies" to the recent development of viewer interactive movies.

In the late nineteenth century the first practical motion pictures comprising pre-recorded sequential frames projected onto a screen at 20 to 30 frames per second to give the effect of motion were developed. In the 1920's techniques to synchronize a pre-recorded audio sequence or sound track with the motion picture were developed. In the 1930's animation techniques were developed to produce hand drawn cartoon animations including animated figures having lip movements synchronized with an accompanying pre-recorded soundtrack. With the advent of computers, more and more effort has been channeled towards the development of computer generated video and speech including electronic devices to synthesize human speech and speech recognition systems.

In a paper entitled "KARMA: A System for Storyboard Animation" authored by F. Gracer and M. W. Blasgen, IBM Research Report RC 3052, dated Sept. 21, 1970, an interactive computer graphics program which automatically produces the intermediate frames between a beginning and ending frame is disclosed. The intermediate frames are calculated using linear interpolation techniques and then produced on a plotter. In a paper entitled "Method for Computer Animation of Lip Movements", IBM Technical Disclosure Bulletin, Vol. 14 No. 10 March, 1972, pages 5039, 3040, J. D. Bagley and F. Gracer disclosed a technique for computer generated lip animation for use in a computer animation system. A speech-processing system converts a lexical presentation of a script into a string of phonemes and matches it with an input stream of corresponding live speech to produce timing data. A computer animation system, such as that described hereinabove, given the visual data for each speech sound, generates intermediate frames to provide a smooth transition from one visual image to the next to produce smooth animation. Finally the timing data is utilized to correlate the phonemic string with the visual images to produce accurately timed sequences of visually correlated speech events.

Recent developments in the motion picture and entertainment industry relate to active viewer participation as exemplified by video arcade games and branching movies. U.S. Pat. Nos. 4,305,131; 4,333,152; 4,445,187 and 4,569,026 relate to remote-controlled video disc devices providing branching movies in which the viewer may actively influence the course of a movie or video game story. U.S. Pat. No. 4,569,026 entitled "TV Movies That Talk Back" issued on Feb. 4, 1986 to Robert M. Best discloses a video game entertainment system by which one or more human viewers may vocally or manually influence the course of a video game story or movie and conduct a simulated two-way voice conversation with characters in the game or movie. The system comprises a special-purpose microcomputer coupled to a conventional television receiver and a random-access videodisc reader which includes automatic track seeking and tracking means. One or more hand-held input devices each including a microphone and visual display are also coupled to the microcomputer. The microcomputer controls retrieval of information from the videodisc and processes viewers' commands input either vocally or manually through the input devices and provides audio and video data to the television receiver for display. At frequent branch points in the game, a list of predetermined choices and responses are presented to the viewer. The viewer may respond using representative code words either vocally or manually or a combination of both. In response to the viewer's choice, the microprocessor manipulates pre-recorded video and audio sequences to present a selected scene or course of action and dialog.

In a paper entitled "Soft Machine: A Personable Interface", "Graphics Interface '84", John Lewis and Patrick Purcell disclose a system which simulates spoken conversation between a user and an electronic conversational partner. An animated person-likeness "speaks" with a speech synthesizer and "listens" with a speech recognition device. The audio output of the speech synthesizer is simultaneously coupled to a speaker and to a separate real-time formant-tracking speech processor computer to be analyzed to provide timing data for lip synchronization and limited expression and head movements. A set of pre-recorded visual images depicting lip, eye and head positions are properly sequenced so that the animated person-likeness "speaks" or "listens". The output of the speech recognition device is matched against pre-recorded patterns until a match is found. Once a match is found, one of several pre-recorded responses is either spoken or executed by the animated person-likeness.

Both J. D. Bagley et al and John Lewis et al require a separate formant-tracking speech processor computer to analyze the audio signal to provide real-time data to determine which visual image or images should be presented to the user. The requirement for this additional computer adds cost and complexity to the system and introduces an additional source of error.

SUMMARY OF THE INVENTION

The present invention provides an educational system which teaches reading, writing, pronunciation and other written language skills by simulating well known paradigms of the physical world and utilizing video animation techniques employing voice synthesis technology and unique animation methods. While primarily intended for teaching language skills, the present invention provides apparatus and methods which may be utilized as a general purpose learning tool, in video games, in motion pictures and in commercial applications such as advertising and communications. Utilizing a real-time random-access audio/visual synthesizer (RAVE) together with an associated special purpose audio/visual modeling language (RAVEL) synthesized actors (synactor) representing real or imaginary people, animated characters or scenes can be simulated and programmed to perform actions including speech which are not sequentially pre-stored records of previously enacted events.

To accomplish this, the communication patterns—the sounds and visual images of a real person or of an animated character associated with those sounds—may be input and decomposed into constituent parts to produce fragmentary images and sounds. Alternately, or in conjunction with this, well known speech synthesis methods may be employed to provide the audio. That set of communication characteristics is then utilized to define a digital model of the motions and sound of a particular person or animated character. A synactor that represents the particular person or animated character is defined by a RAVEL program containing the coded instructions for dynamically accessing and combining the video and audio characteristics to produce real-time sound and video coordinated presentations of the language patterns belonging to that person or animated character. The synactor can then perform actions and read or say words or sentences which were not pre-recorded actions of the person or character the synactor models. Utilizing these techniques a synactor may be defined to portray a famous person or other character, a member of one's family or a friend or even oneself.

In the preferred embodiment RAVEL is used to define animated lip-synchronized talking characters (or faces) in an educational system. A user is presented with a viewing screen or other visual display having several rows of what are perceived to be domino-like anagram tiles each inscribed with a letter or phonogram (a set of letters that produce a sound) and arranged across the top and down the left side of the screen in rectangular enclosures called trays. A talking head or other portion of a synactor's body is displayed in the upper left-hand corner of the screen while the majority of the screen, framed on the top and left side by the tiles, is reserved as a playing field where a user constructs words or other configurations with the tiles.

When the user selects a tile the talking head pronounces the proper sound or sounds associated with the letter or phonogram selected. The selected tile may then be positioned on the playing field to begin a word or add to an existing string of letters. The talking head then pronounces the resulting combination of letters and phonograms. In this manner, a user can construct sequences of letters constituting phonetic or real words or even sentences on the screen. The sequence of letters will then be pronounced, even if the particular combination of letters is nonsense. The pronounciation of the word or words on the playing field proceeds in synchrony with a wave of highlighting that moves from left to right in the word, thus reinforcing the left to right reading methodology (in the case of English). Each letter in the word is highlighted during the audio presentation of the part of the combined sound for which that letter is responsible. The word may also be "sounded-out" (present each of a word's component sounds separately in sequence: syncopated or unblended speech) while highlighting the responsible letter or letters. Context letters influencing the sound made by a particular letter in a word may also be indicated by highlighting. The talking head provides synchronized moving lips as well as other head and body movements to provide audio and visual clues present in human speech.

The primary means of user interaction with the system is through the use of a pointing device such as a light pen, mouse or even a finger tip for a touch screen. Using a mouse, the user selects a tile, picks it up from a tile tray and drags it onto the playing field. The tiles are perceived as three-dimensional objects having shadows and/or other visual cues which can be moved about on the playing field and to and from electronic stacks arranged in rows and columns in the tile trays at the top and left side of the screen.

The talking head figure's functions include enhancing the recognition of its synthesized speech with synchronized lip movements and other gestures. The talking head also warms up the cold and mechanical tile-screen layout to make the instruction or learning game more attractive and emotionally appealing. It also encourages imitation by demonstrating the forming of sounds with the mouth. Further, the talking head may serve as a "master of ceremonies" or "simulated teacher" for the learning program, explaining and demonstrating its use or interrupting long periods of user inactivity to wake up and encourage the user by showing, explaining, directing and commenting on certain actions. The talking head may include hands as well to teach lip reading and sign language or other communication methods to the hearing impaired. The entire body may be included to demonstrate semaphore signals or dance notation. For games, multilingual learning programs or other applications more than one talking head may be displayed on the screen.

The system may be set up to provide an educator or instructor the capability to create or modify sets of the tiles for specific instruction methods and to track, evaluate and report the progress of a student to an instructor. It can be programmed to display or animate an object or word when triggered by certain user actions; to display the word "CAT" and/or a picture of a cat when the user builds the word "KAT", for example. Additional modes of operation of the system include the capability to add (or change) words and images to its vocabulary and to have two or more separate vocabularies displayed simultaneously for foreign language instruction. Multiplayer competitive word games such as Scrabble may also be programmed in the system. The system may be programmed to provide increasingly difficult levels of instruction. In this manner, a user can deal with only a few letters at first, and, as the user demonstrates familiarity by following instructions from or imitating the "simulated teacher" the program adds letters and words of greater difficulty.

BRIEF DESCRIPTION OF THE DRAWINGS

FIG. 6 is a table providing a sample listing of the RAVEL program containing the phonetic and orthophonetic rules used in the system of FIG. 1;

FIG. 9 is a diagrammatical representation of the utilization of text translation rules to translate a character string;

DETAILED DESCRIPTION OF THE PREFERRED EMBODIMENT

Figure 1:
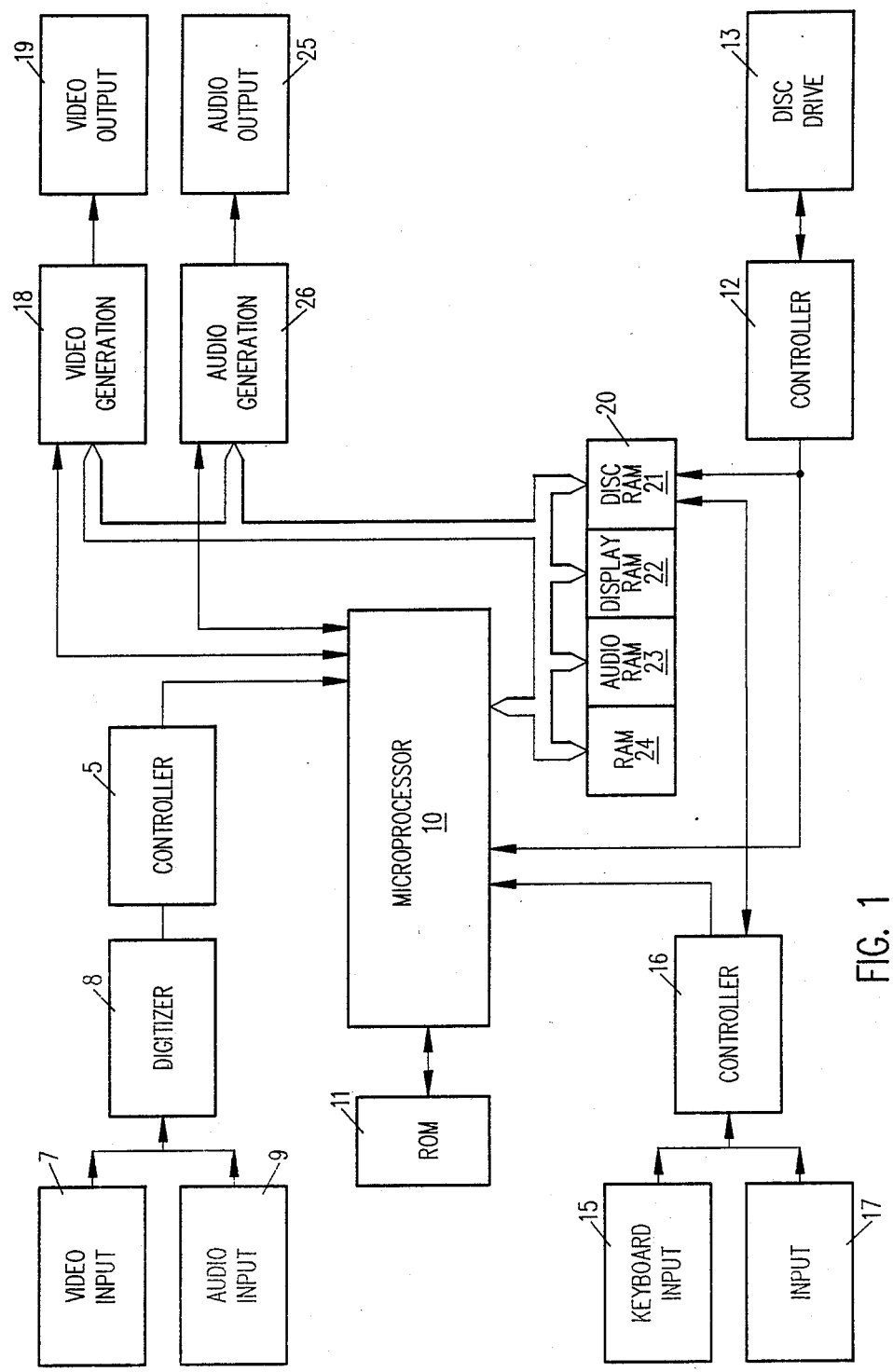
FIG. 1 is a block diagram of a system which displays computer generated visual images with real time synchronized computer generated speech according to the principles of the present invention.

Referring now to FIG. 1, in one preferred embodiment of the present invention, a special purpose microcomputer comprises a program controlled microprocessor 10 (a Motorola MC68000 is suitable for this purpose), random-access memory (RAM) 20, read-only memory (ROM) 11, disc drive 13, video and audio input devices 7 and 9, user input devices such as keyboard 15 or other input devices 17 and output devices such as video display 19 and audio output device 25. RAM 20 is divided into four blocks which are shared by the microprocessor 10 and the various input and output devices.

The video output device 19 may be any visual output device such as a conventional television set or the CRT for a personal computer. The video output 19 and video generation 18 circuitry are controlled by the microprocessor 10 and share display RAM buffer space 22 to store and access memory mapped video. The video generation circuits also provide a sixty Hz timing signal interrupt to the microprocessor 10.

Also sharing the audio RAM buffer space 23 with the microprocessor 10 is the audio generation circuitry 26 which drives the audio output device 25. Audio output device 25 may be a speaker or some other type of audio transducer such as a vibrator to transmit to the hearing impaired.

Disc controller 12 shares the disc RAM 21 with the microprocessor 10 and provides for reads from, and optimally writes to, a suitable non-volatile mass storage medium such as floppy disc drive 13. Disc drive 13 provides additional RAM space for special operating programs and applications. Disc storage would not be needed in a host machine which had sufficient ROM.

Input controller 16 for the keyboard 15 and other input devices 17 is coupled to microprocessor 10 and also shares disc RAM 21 with the disc controller 12. This purpose may be served by a Synertek SY6522 Versatile Interface Adaptor. Input controller 16 also coordinates certain tasks among the various controllers and other microprocessor support circuitry (not shown). A pointing input device 17 such as a mouse or light pen is the preferred input device because it allows maximum interaction by the user. Keyboard 15 is an optional input device in the preferred embodiment, but in other embodiments may function as the pointing device, or be utilized by an instructor or programmer to create or modify instructional programs or set other adjustable parameters of the system. Other pointing and control input devices such as a joy stick, a finger tip (in the case of a touch screen) or an eye-motion sensor are also suitable.

RAM 24 is the working memory of microprocessor 10. The RAM 24 contains the system and applications programs and other information used by the microprocessor 10. Microprocessor 10 also accesses ROM 11 which is the system's permanent read-only memory. ROM 11 contains the operational routines and subroutines required by the microprocessor 10 operating system, such as the routines to facilate disc and other device I/O, graphics primitives and real time task management, etc. These routines are additionally supported by extensions and patches in RAM 24 and on disc.

Controller 5 is a serial communications controller such as a Zilog Z8530 SCC chip. Digitized samples of video and audio may be input into the system in this manner to provide characteristics for the talking heads and synthesized speech. Digitizer 8 comprises an audio digitizer and a video digitizer coupled to the video and audio inputs 7 and 9, respectively. Standard microphones, videocameras and VCRs will serve as input devices. These input devices are optional since digitized video and audio samples may be input into the system by keyboard 15 or disc drive 13 or may be resident in ROM 11.

Figure 2A:
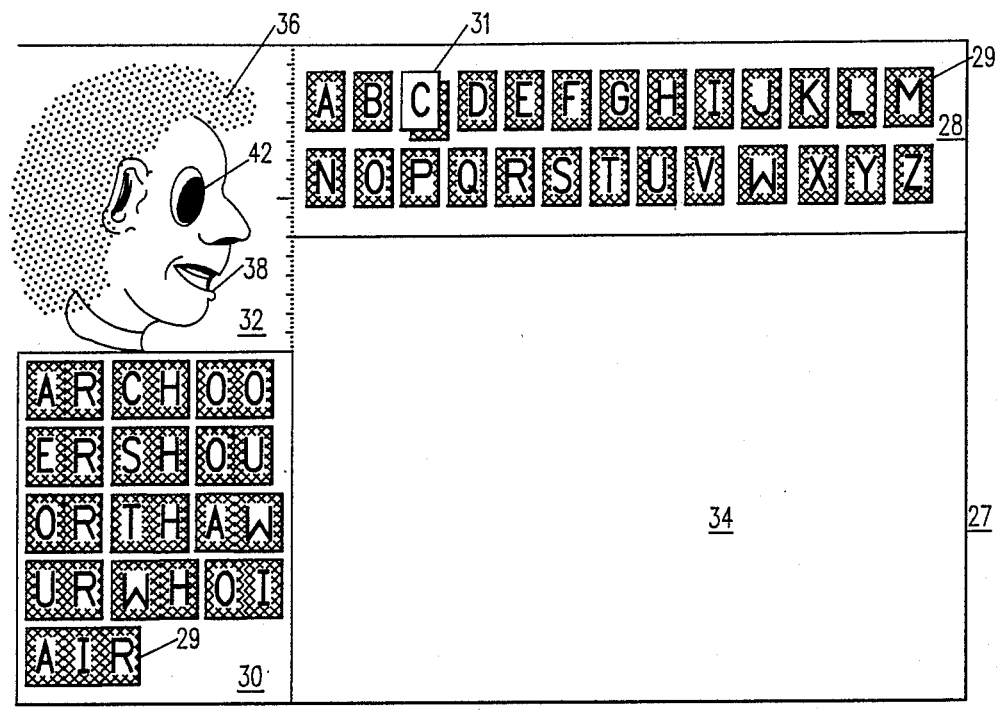
FIGS. 2a-2q are a sequence of presentations of the display screen illustrating the screen layout and demonstrating the forming of the word "CAT" according to the system of FIG. 1.
Figure 2B:
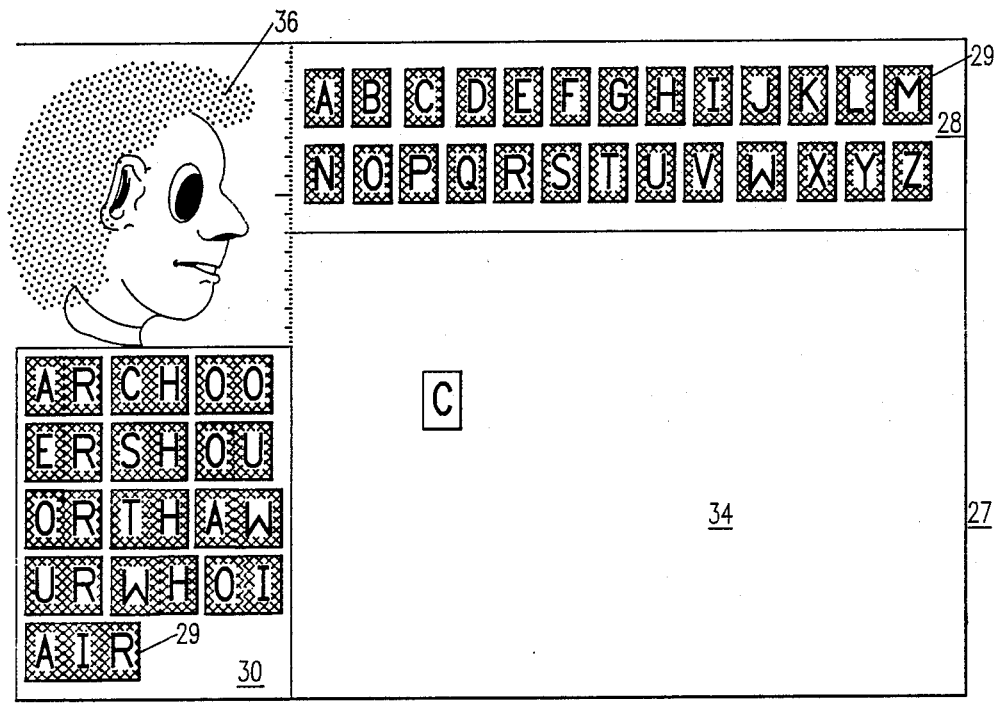
FIG. 2r illustrates the utilization of animated hands to teach or communicate with sign language incorporated with the features of the screen layout of FIGS. 2a-2q.
Figure 2C:
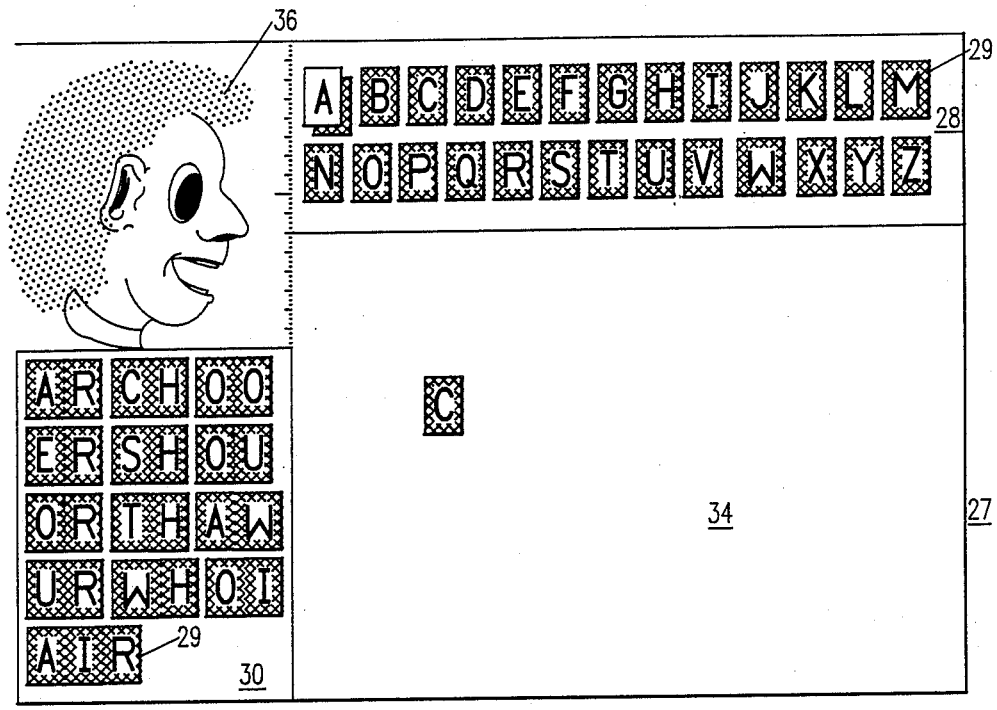
Figure 2D:
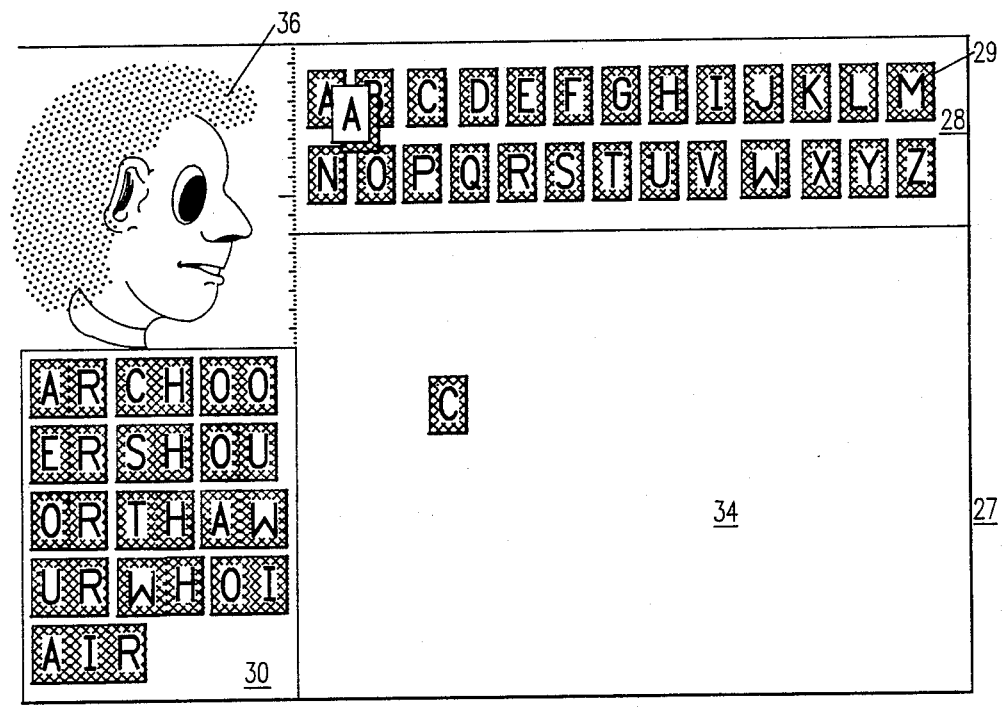
Figure 2E:
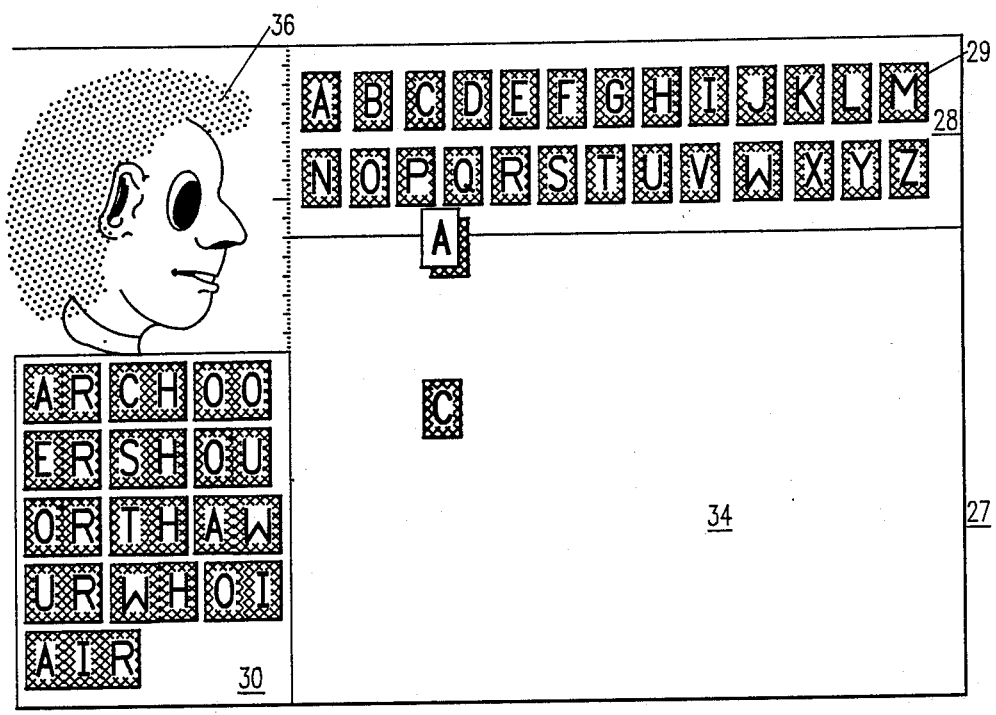
Figure 2F:
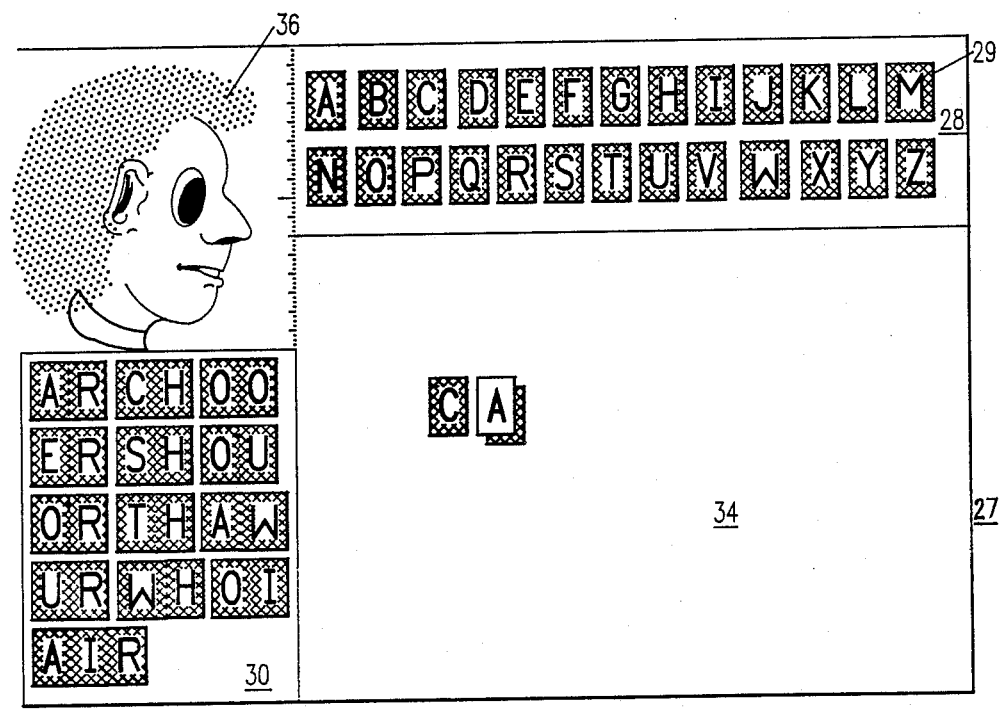
Figure 2G:
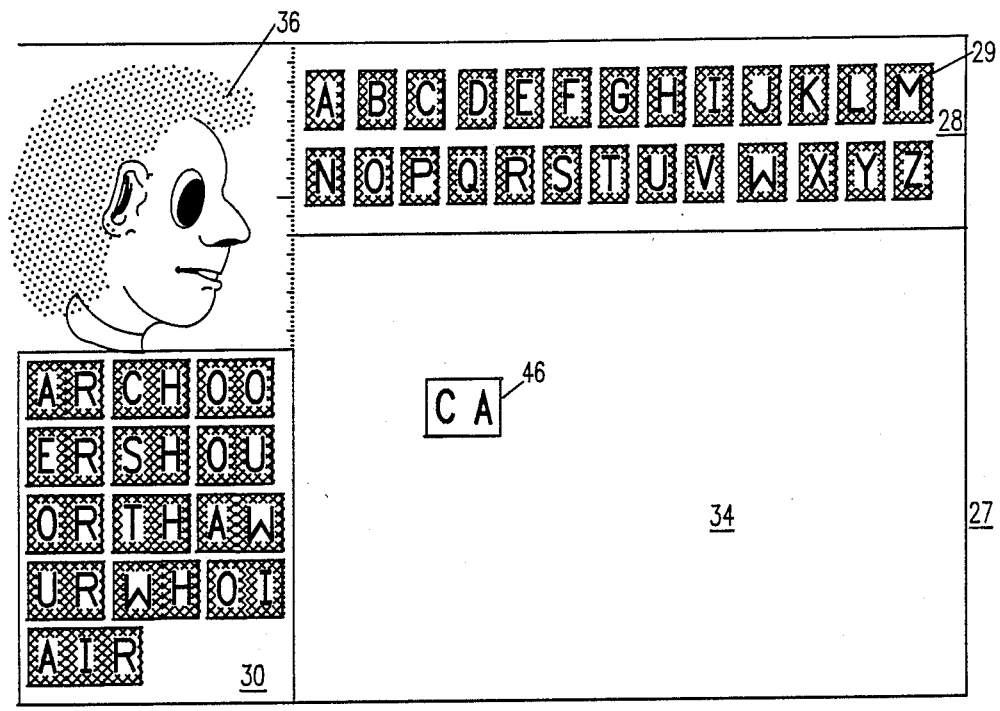
Figure 2H:
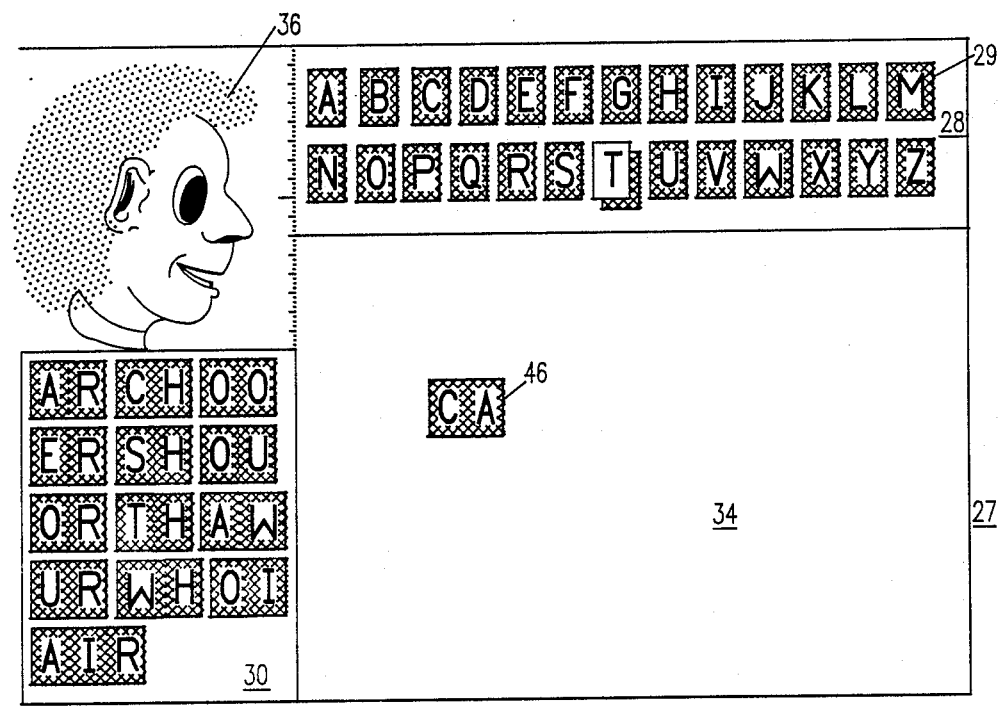
Figure 2I:
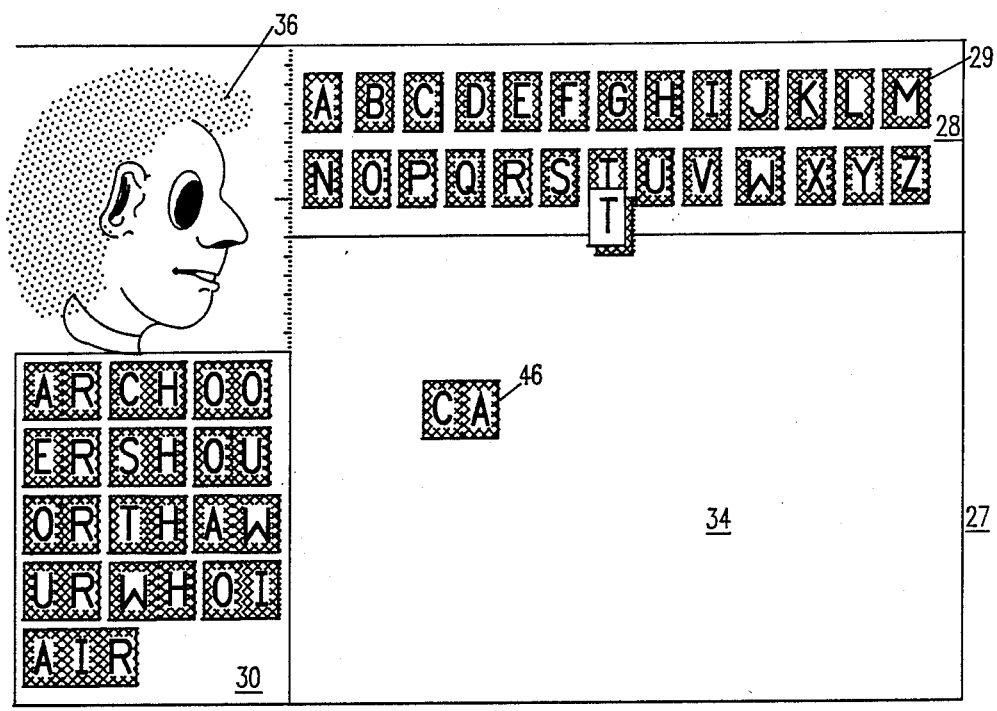
Figure 2J:
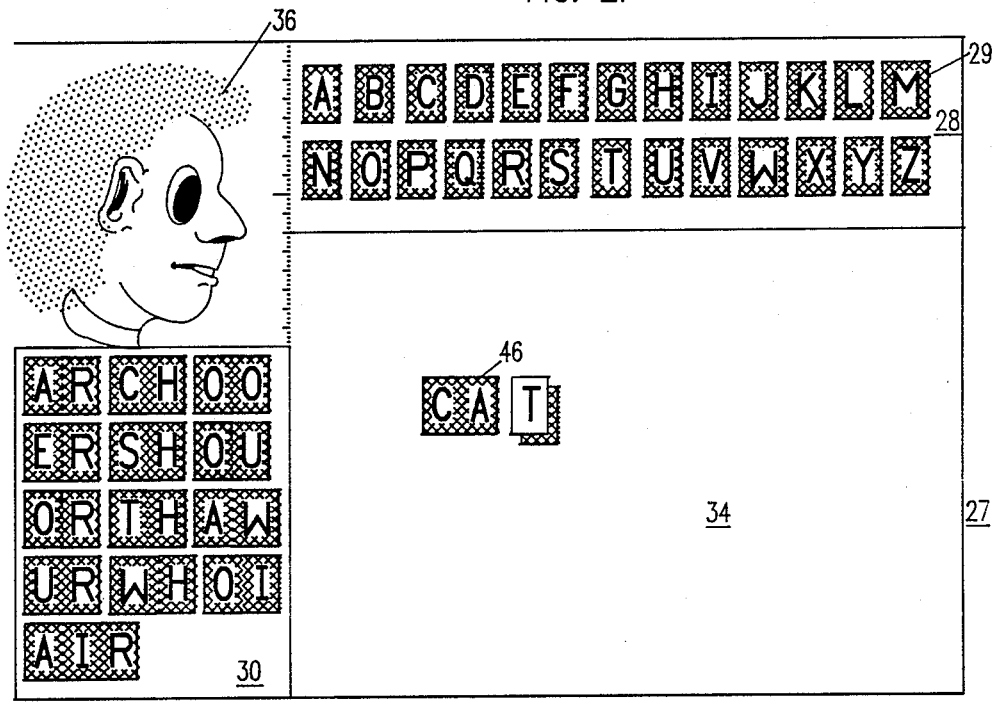
Figure 2K:
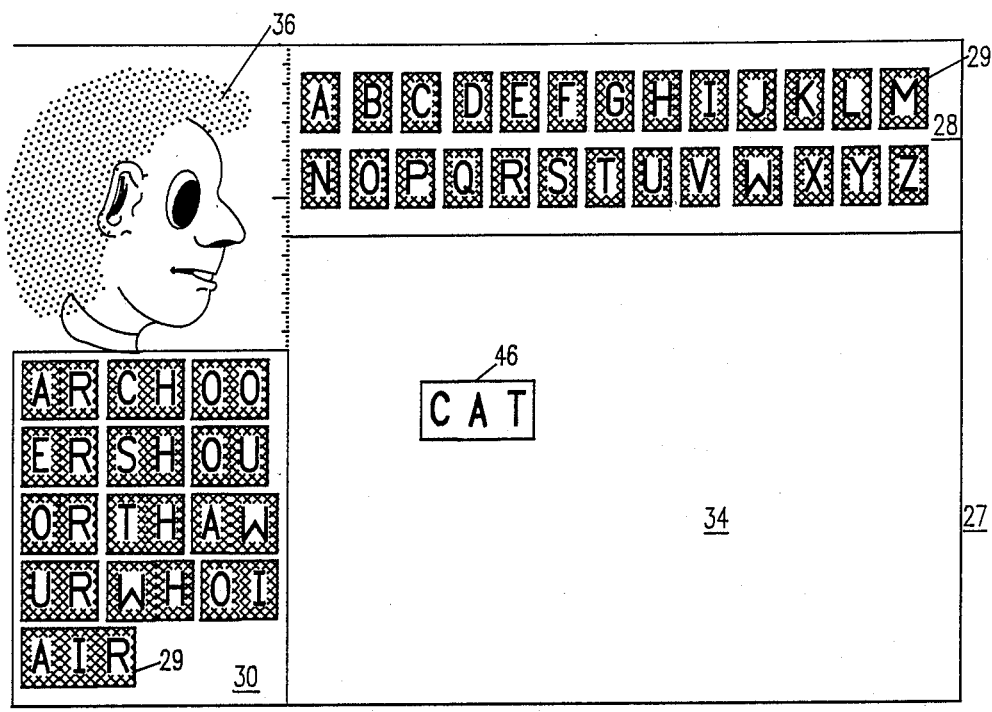
Figure 2L:
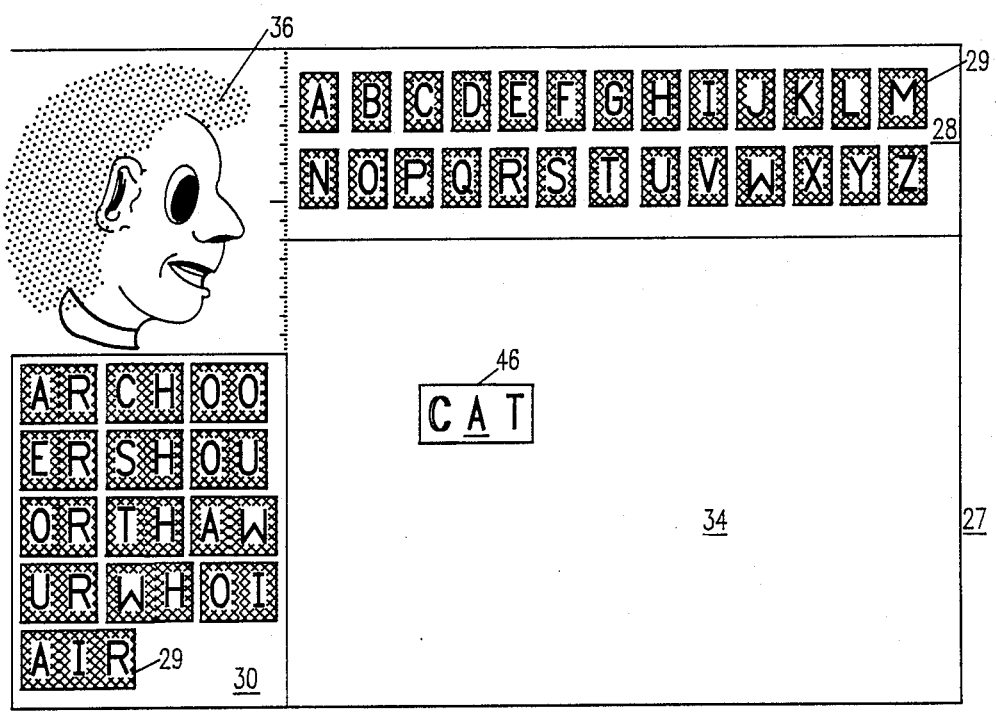
Figure 2M:
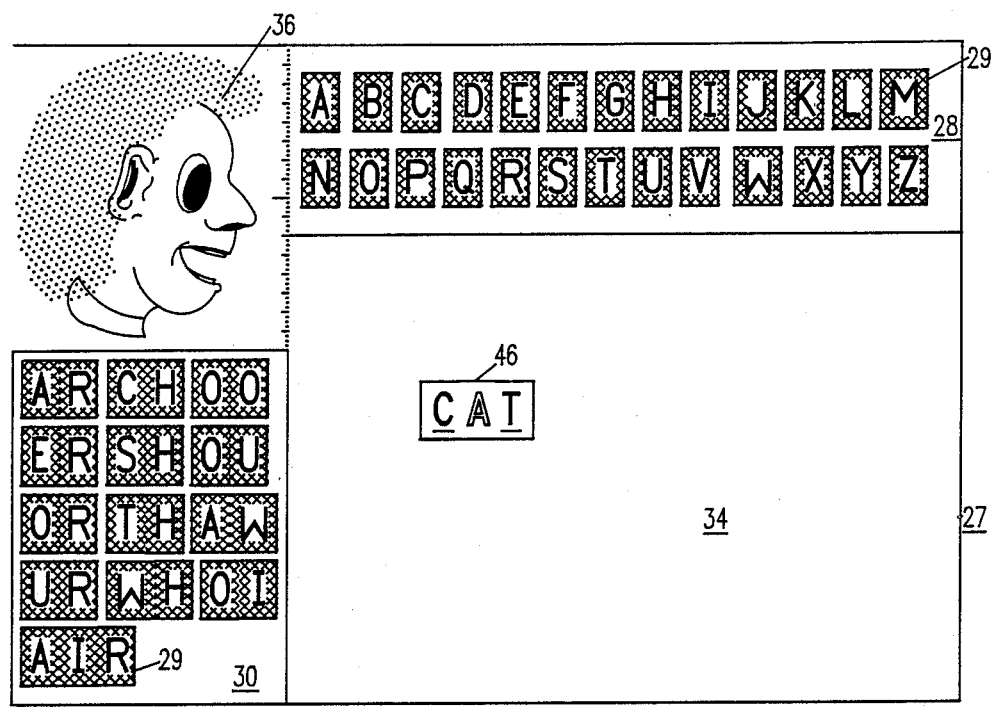
Figure 2N:
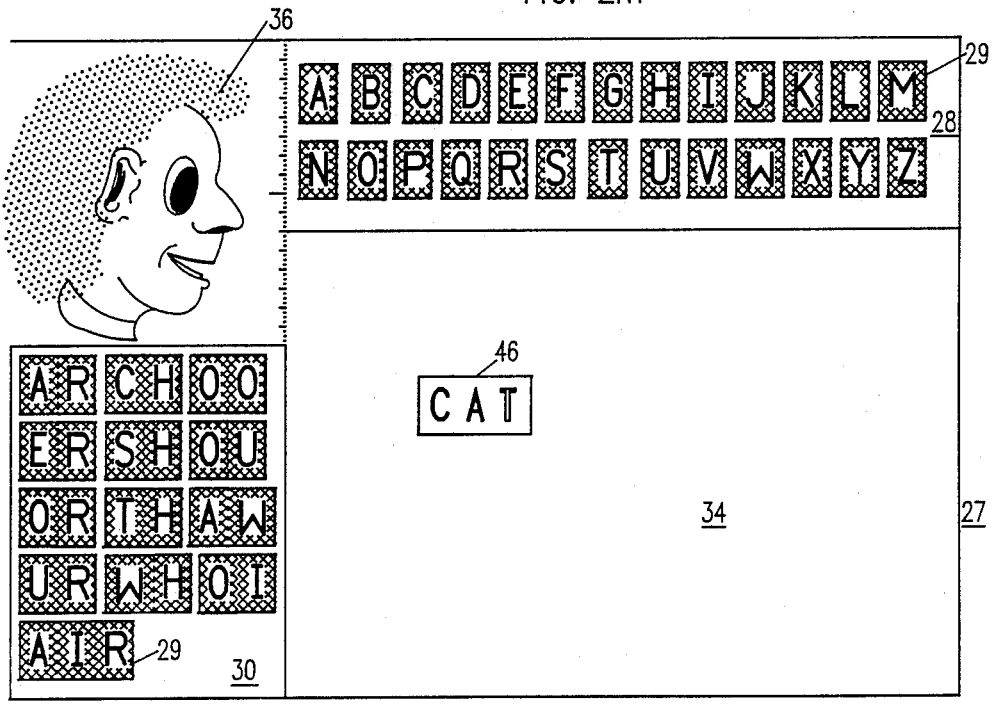
Figure 2O:
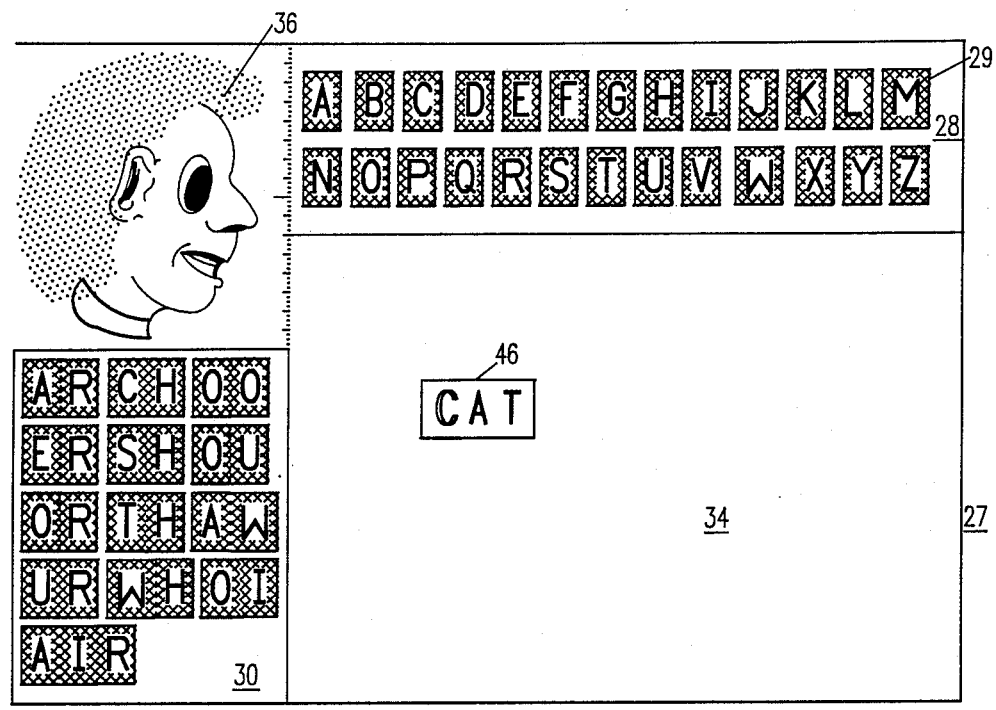
Figure 2P:
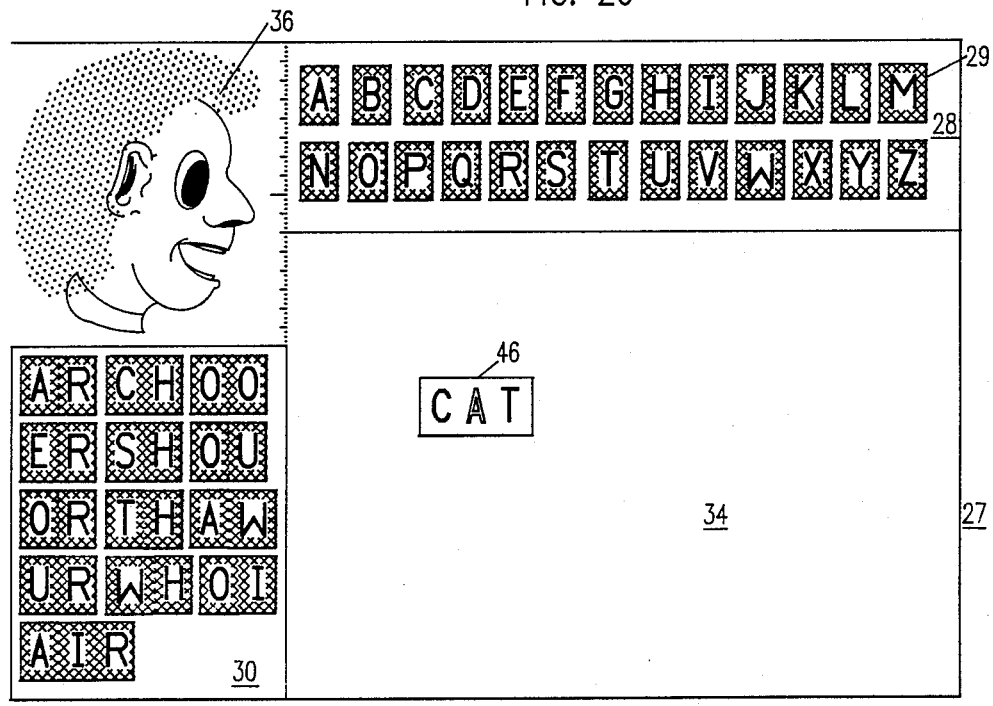
Figure 2Q:
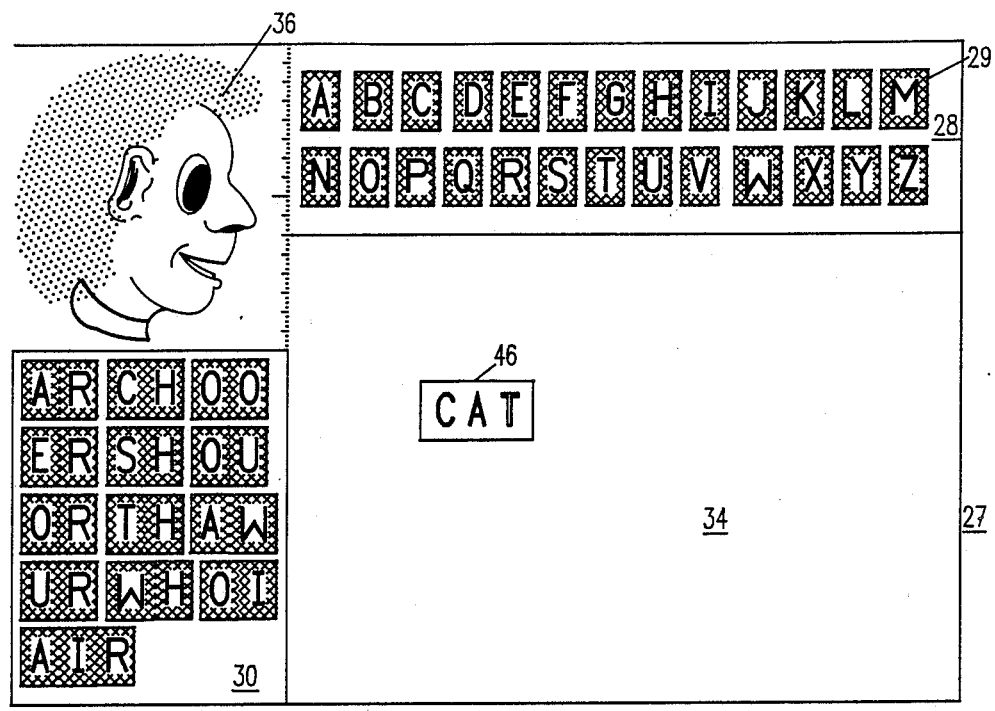

Referring now also to FIGS. 2a-2q, a series of sequential display screens 27 is shown which illustrates the forming of an example word "CAT" in response to user input to the microcomputer system shown in FIG. 1. The display screen 27 utilized by video output device 19 presents a user with graphic images of what are perceived to be domino-like anagram tiles 29, each inscribed with a letter or phonogram (set of letters that make a sound), or with any other visual symbolic representation of language or sound. In an electronic tray 28 along the top of the screen 27 two rows of tiles 29 having the 26 standard English letters inscribed on them are positioned. In a second electronic tray 30 along the left side of the screen 27 are arranged columns of tiles 29 having commonly occurring phonograms inscribed on them. The tiles 29 are electronically stacked in individual electronic stacks 31. As tile 29 is lifted from its tray 31 and moved to another position on screen 27, an identical tile "pops" up in the tray from the electronic stack 31 such that there is always a tile 29 available in each stack 31. The trays 28, 30 are shown as flat rectangular outlines, but could be more elaborate flat graphic images or shown in 3-dimensional perspective. The trays 28, 30 are positioned to leave a rectangular space 32 in the upper left-hand corner of the screen 27. The majority of screen 27 bordered by the right side and bottom of the screen is reserved as a playing field 34.

Referring now generally to FIG. 2, the tiles 29 are selected and moved or otherwise manipulated on the playing field 34 by the use of a mouse or other input device 17 (as shown in FIG. 1). The user may select a tile 29 from its stack 31 and move it onto the playing field or may, similarly, dispose of a tile 29 already present on the playing field 34. To remove a tile 29 from the playing field 34, a user moves the tile 29 back to its tray 28, 30 and drops it. The tile will appear to sail over that tray and settle on top of the appropriate electronic stack in the tray. If a tile 29 is dropped on a tray 28, 30 containing no tray tile which matches the tile dropped, the tile will move or "scoot" to the edge of the screen 27 and disappear. Similarly, a user may dispose of a tile 29 by simply moving it to the synactor image display area 32 and dropping it and the tile will disappear off the edge of the screen.

The space 32 in the upper left-hand corner is occupied by an animated figure or animal or other synactor (an animated elf-like FIG. 36 is used in FIG. 2). Generally head and shoulders only are displayed to form a talking head 36. Synchronized movement of the lips 38 and face is provided when sounds are produced. The head 36 or just the eyes 42 may move to follow tile motion and may blink or wink at appropriate times or move to establish simulated eye contact with the user. As shown in FIG. 2r, hands 48 or gestures may also be displayed to facilitate the use of sign language to communicate with or instruct the hearing impaired. The head 36 and the hands 48 may be positioned together (as shown in FIG. 2r) or they may occupy different positions on the screen; the head 36 in the upper left-hand corner 32 and the hands 48 in the lower right-hand corner of the playing field 34, for example. The system may also be programmed to allow the user to move the head 36 or synactor about the screen in the same manner as the tiles 29 are moved.

The user interacts with the system by pointing or otherwise selecting a particular tile 29 with an input device 17 such as a mouse. In FIG. 2a, the user has selected the tile "C". The tile "C" has been highlighted and the talking head 36 is shown pronouncing the sound "KAH" (sounds like "kuh") made by the letter "C" when spoken alone. By use of the mouse, the "C" tile is picked up and moved to the playing field 34. When a tile 29 is moved away from its position at the top (or left side) of the screen 27, another identical tile "pops" up from the "electronic stack" beneath it and is available for use. When the tile is moved onto the playing field 34 and released, it appears to settle down onto the surface of playing field 34 as shown in FIG. 2b.

In FIGS. 2c–2g, the user has selected a second tile inscribed with the letter "A" and moved it to the playing field 34. When the "A" tile is released onto the playing field adjacent to the "C" tile, the "A" tile will be attracted to, move toward, attach and fuse with the "C" tile forming one tile 46 having the word "CA" inscribed on it. The sound of the word "CA" is sounded out and then pronounced by the talking head 36 in synchrony with highlighting of the letters and the tile 46 is highlighted. Similiarly, in FIGS. 26h–26k, the tile having the letter "T" inscribed is selected and placed on the playing field 34 to form one tile 46 having the word "CAT" inscribed on it. The word "CAT" is then sounded out by talking head 36 while the individual letters are highlighted.

As shown in FIG. 2l, the talking head 36 is pronouncing the sound of the letter "C" and the letter "C" is highlighted. The following letter "A" is underlined to indicate that its position in the word "CAT" (i.e., following "C") influences the sound of the "C" in the combination of letters that makes up the word "CAT". (In the word "CAT", the "C" has a hard sound (like "K") rather than a soft sound (like "S"), for example.) After a brief interval, or when the user commands, the talking head 36 pronounces the letter "A" (a short "a" sound in this example) while the letter "A" is highlighted and both the "C" and the "T" are underlined to indicate that both the preceding "C" and the following "T" influence the sound of the "A" in the word "CAT" (as shown in FIG. 2M). Similarly, after a brief interval, the talking head 36 pronounces the sound of the letter "T" while "T" is highlighted. In this example, the letters "C" and "A" have no influence on the sound of the "T" and, thus are not underlined (as shown in FIG. 2N).

Referring now to FIGS. 2o–2q, the next phase consisting of the smooth, continuous pronunciation of "CAT" is illustrated. Each letter, in turn, is highlighted during the portion of the pronunciation in which its sound is most prominent. During continuous or blended speech, the sounds of the phonemes will overlap because of several factors, notably coarticulation. The overall effect is to demonstrate to the user how letters and their sounds are combined to produce words. The method described hereinabove provides significant improvement over prior art teaching methods relating to language and speech skills.

Figure 2R:
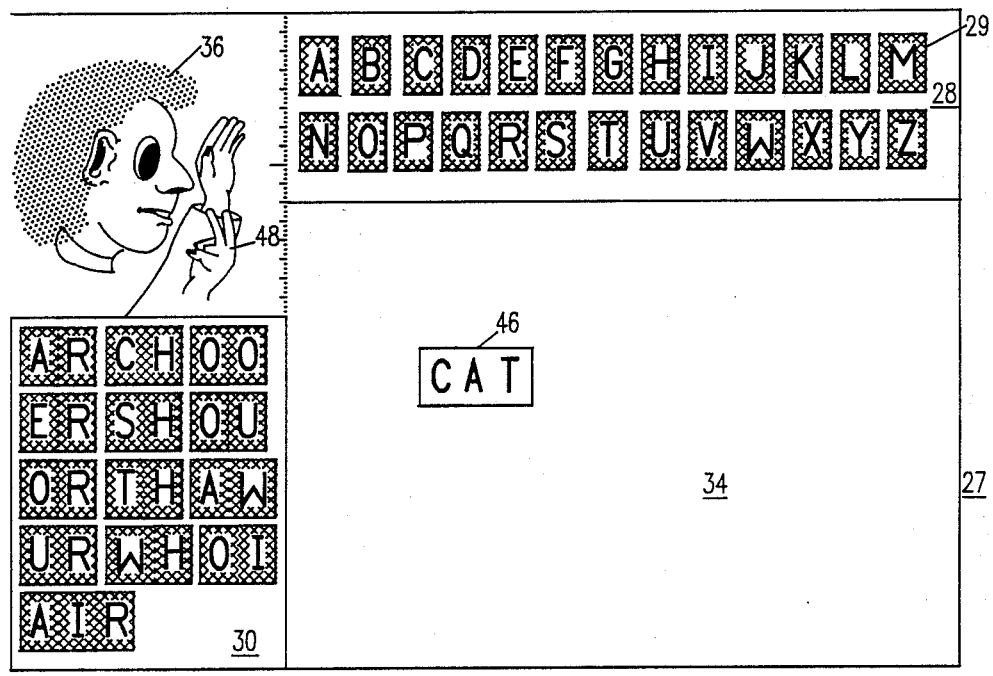

As shown in FIG. 2r, the talking head 36 may include hands 48 or other portions of the body to provide visual instruction to the hearing impaired or to provide additional visual cues for whatever is being displayed on the playing field 34.

Figure 3:
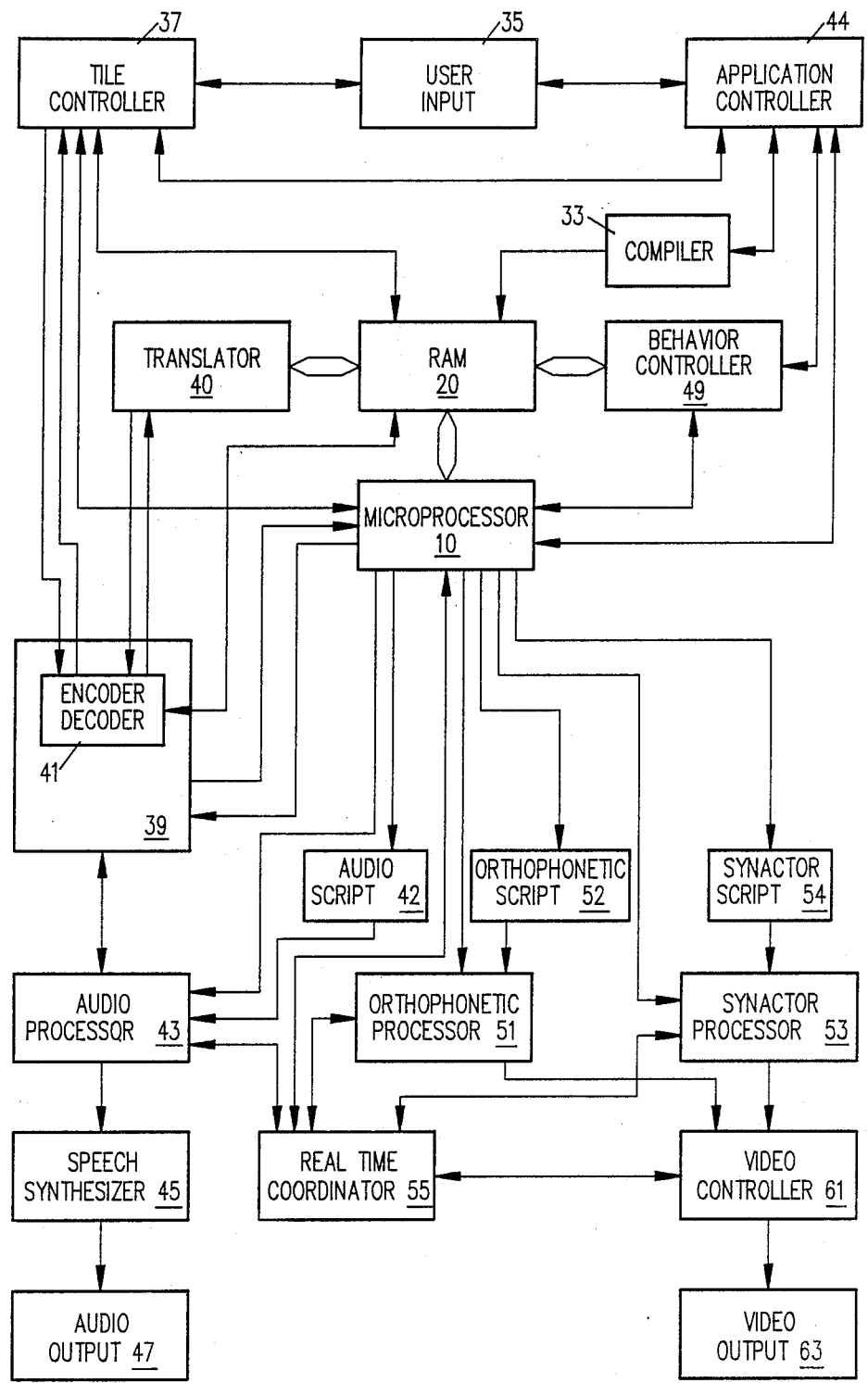
FIG. 3 is a detailed functional block diagram illustrating the major data flows and processes in the system illustrated in FIG. 1.

Referring now to FIG. 3, a functional block diagram illustrating major data flows, processes and events required to provide speech and the associated synchronized visual animations is shown. A general overview of the processes and events that take place in the real time random-access audio/visual synthesizer (RAVE) is given. The application controller 44 calls on the microprocessor 10 (shown in FIG. 1) to translate digitized text from the serial communications controller 5 or read in or compile a RAVEL program containing the audio and visual characteristics of a particular synactor via compiler 33. In response to a user input 35 the application controller 44 activates the tile Controller 37 to control the user interaction with the tiles 29, using the Narrator Device Integrator Encoder/Decoder 41 as required, until the point at which it is necessary to direct the RAVE to say something. The application controller 44 will then call on the microprocessor 10 to initiate the RAVE sound and animation processes.

The process flow in RAVE is broken down into two phases: real time phase and non-real time phase. To meet time and other constraints of both the microprocessor and the real world, as much of the processing as is possible is completed prior to the commencement of actual speech and animation of the tiles 29 and synactor 36 (as shown in FIG. 2). This is accomplished within RAVE by generating scripts for each of the real time processes that must occur to complete the commands initiated by the user input 35.

When directed to pronounce a character string or word, the microprocessor 10, the heart of the RAVE, uses the narrator device integrator 39 and the encoder/decoder 41 to translate it and generate an audio script for the particular narrator device (audio processor) 43 that produces a particular synactor's voice. Using additional information derived from the RAVEL program containing the characteristics of a particular synactor, and from the synactor behavior controller 49 or the application controller 44 or the tile controller 37, the microprocessor 10 writes the orthophonetic and synactor scripts for the orthophonetic animation processor 51 and the synactor animation processor 53, respectively. The animation processors may be embodied in hardware and firmware or may be involved parametrically or microprocessor 10 may generate them at runtime, through internal compilation processes. Internal compilation will speed up the RAVE's real-time phase but slows the non-real time phase and may require more RAM.

When the processor scripts are complete, the microprocessor 10 passes control to the real time coordinator 55. The real time coordinator initiates each processor 43, 51, 53 at the proper time and insures that each event in the respective script is executed at the proper time. Typically this consists of cueing events in the orthophonetic and synactor processors 51 and 53 from the audio processor 43 events or with the timing interrupts from the video controller 61.

In order to further elucidate the processes illustrated in FIGS. 2 and 3, a sample process pronouncing and displaying a tile 46 with the word "CAT" (as illustrated in FIGS. 2a-2c) on it will be traced. As a preliminary step, compiler 33 has compiled a RAVEL program containing a phonology description source file and stored in RAM 20 the synactor voice and behavioral characteristics data structures that the microprocessor 10 will require for the animation.

Figure 4:
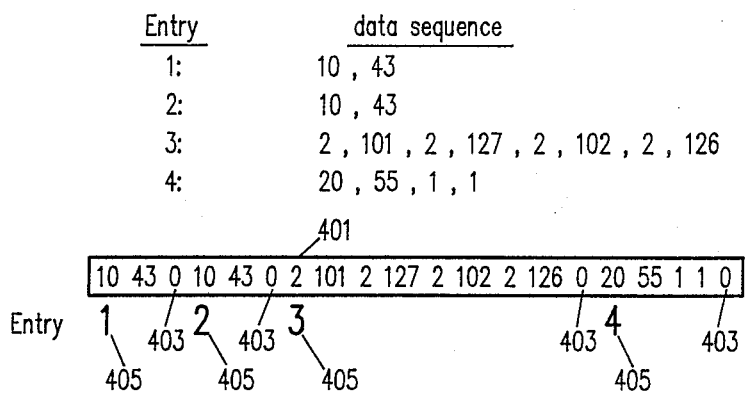
FIG. 4 is a diagram illustrating the construction of a count-off table.

In order to save memory space, some of the data structures consist of count-off tables, as illustrated in FIG. 4. In a standard look-up table, each address provides the same amount of memory bytes regardless of the length of the data to be stored at that address. In the count-off table 401, data sequences are stored in serial fashion with a unique marker 403 at the end of each data sequence. The search process, rather than searching the same number of bytes each time, searches for the unique markers 403, and increments an index 405 whenever the unique marker is found. When a match is found, the index 405 at that point becomes a unique identifier for that data sequence.

Once the data structures have been compiled and stored, the tile controller 37 or the application controller 44 will initiate the microprocessor 10. The tile controller 37 keeps track of data associated with each of the tiles 29 displayed on the screen 27: how many tiles 29 there are and what their positions are on the screen 27, etc. The tile controller 37 also generates new tiles, disposes of tiles, fuses the tiles together and moves (scoots) the tiles around on the screen in response to user inputs. The tile controller 37 accesses a font file which contains graphic parameters or bitmap images corresponding to each orthographic character as identified by an 8-bit ASCII or other standardized representation. The tiles are generated and controlled by well-known methods and circuitry and will be further detailed herein below.

The text "CAT" of the example tile "CAT" (as shown in FIG. 2q) formed by the tile controller 37 as a result of the fusion of the tiles "CA" and "T" is coupled to encoder/decoder 41 in the narrator device integrator 39. The narrator device actually produces the speech when supplied with a phonetically encoded character string. In this preferred embodiment of the RAVE, the narrator device is made up of audio processor 43, speech synthesizer 45 and audio output device 47. Each synactor is associated with a particular narrator device to provide its voice, and with a set of text-to-phonetic translation rules. For multi-lingual applications, a different set of rules is almost always required for each language. A particular narrator device may be shared by several synactors.

The phonetic codes of a particular narrator device may designate speech segments in numerous ways, such as sentences, words, syllables, inverse syllables (lisibles), phonemes, etc. A phoneme is the smallest unit of speech that serves to semantically distinguish one utterance from another in a language or dialect. Other speech attributes such as stress, pitch and speed may be coded also. To provide generality, each code in a synactor's particular set of narrator device speech segments and other codes is identified by a RAVE code called a phocode. The encoder/decoder 41 in the narrator device integrator 39 maps the phonetic encoding for a particular character string into the corresponding phocodes for the voice associated with a particular synactor.

The encoder/decoder 41 sends the character string "CAT" to the text-to-phonetics translator 40 which retrieves the proper data structures from RAM 20 to transform the character string "CAT" into a phonetic representation, "KAET", which is dependent on the particular narrator device (voice) being utilized.

Text-to-phonetics translator 40 also generates an Orthophonetic Correspondence Record (OCREC) using data structures stored in RAM 20. The OCREC contains information required by the microprocessor 10 to animate the orthographic characters (the letters on the tiles) to illustrate the correspondence of the letters with their sounds. For this example, "CAT", the OCREC will specify the effects which show that the "C" is associated with the sound "K", the "A" with the sound "AE" (short a), and the "T" with the sound "T". The encoding process to generate an OCREC is shown in greater detail in FIGS. 9 and 10.

The OCREC and phonetic string "KAET" are returned to the encoder/decoder 41 where the phonetic string is split into its component phonetic codes (for the particular narrator device to be used) and is mapped to its phocode representation, in this case "49 19 57" followed by a zero terminator. This phocode string representating "CAT" is returned to the tile controller 37 along with the OCREC for "CAT". Since the phonetic string is phocoded prior to being returned, the tile controller 37 and applications controller 44 are independent of the particular narrator device encoding method to be utilized to produce the speech. The tile controller 37 stores this information until it is required to pronounce the sounds associated with that tile or set of tiles. It then sends to the microprocessor 10 the phocoded string, the OCREC and additional information which specifies the orthographic characteristics of the text display, including font, size, face (bold or italics for example), color, spacing and location coordinates for the screen.

The microprocessor 10 accesses RAM 20 for the synactor data structures corresponding to the phocoded string of this example. These include the image sequences and context dependent manipulations as programmed in the RAVEL source code for each phocode for this synactor audio visual model. This includes data for syncopated speech—the sounds used in "sounding out" a word—but does not include the data required to say the name of each letter in a word or to display sign language finger positions for spelling out with hand signs. These functions are addressed by structures related to language orthography which are accessed by the tile controller 37.

The microprocessor 10 passes the phocoded string to the narrator device integrator 39 where the encoder/decoder 41 decodes the phocode string and maps it back to the phonetic code "KAET" and returns it to the microprocessor 10. The "KAET" representation is used only within the RAVE, the applications controller 44 and the tile controller 37 use the character string "CAT" and/or the phocode string created by the narrator device integrator 39.

Behavior of the synactor not associated with actual speech, when a synactor turns towards the user or winks or blinks, for example, is controlled by the synactor behavior controller 49 and is implemented with sequences of images just as the speech segments are, and each action or behavioral trait is given its unique coded representation. The application controller 31 and the microprocessor 10 couple information related to a synactor to the behavior controller 49 describing what is going on much as a person's external and internal senses communicate with the brain where certain events or combinations trigger behavioral traits. The behavior controller 49 accesses RAM 20 for data structures compiled from the RAVEL source program to simulate personality and give each synactor a character of its own.

The microprocessor 10 uses this information to generate the raw synactor, orthophonetic and audio scripts and directs the audio script generator 42, orthophonetic animation script generator 52 and the synactor animation script generator 54 to process the raw scripts to produce final scripts. This includes inserting a rest position at the end of each script, generating inbetweens (RAVEL-specified and/or automatically generated transition visual images) etc.

Once the final scripts are generated, the scripts are acted out; i.e., coordinated in real-time by the Real Time Coordinator 55 to provide the audio and display the associated time synchronized video called for by the user input.

The real time coordinator 55 coordinates the audio processor 43 and the animation processors 51 and 53. The coordination process is a function of the microprocessor 10 interrupt structure and the particular narrator device characteristics. In the preferred embodiment, the orthophonetic and synactor processors 51 and 53 are treated as interrupt tasks triggered every sixtieth of a second by the vertical retrace trigger from the video generator 18 (as shown in FIG. 1). The audio processor 43 and the animation processors 51 and 53 are initiated at the proper times so that when the narrator device begins to speak, the orthophonetic and synactor processors 51 and 53 cue the video controller 61 to display the orthophonetic and synactor images on the screen 63 which correspond to that speech. The audio processor 43 continues to execute the audio script with its own subroutines and timing creating and blending speech segments while the animation processors 51 and 53 execute the animation scripts in response to the vertical retrace trigger interrupts. While the synchronization between the audio and the animation may not be exact, it is close enough for the human mind to accept.

Alternately, or in conjunction with the above described synchronous technique, an audio processor 43 which provides real time feed back to the real time coordinator 55 will allow the audio processor 43 to set the pace and maintain more exact synchronization. An audio event counter will then trigger a master event counter (not shown) which will trigger the animation processors 51 and 53 according to their scripts to insure that the video does not get ahead of the audio, thereby insuring real time synchronization between the audio and the video.

Figure 5:
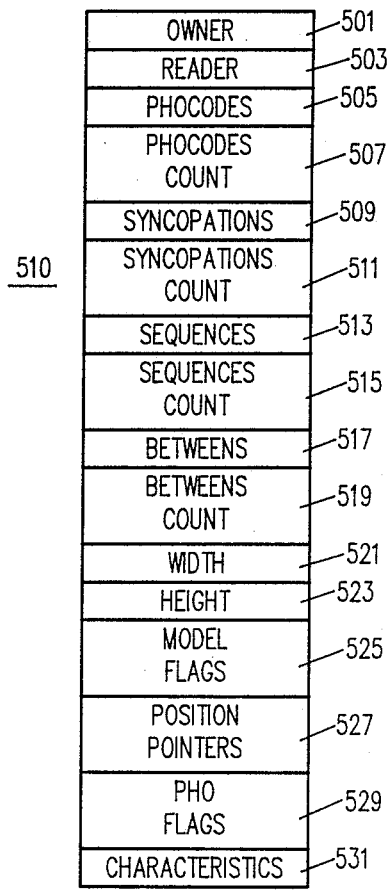
FIG. 5 is a diagram illustrating a synactor model table record.

Referring now to FIG. 5, a synactor model table is illustrated. A number of internal data structures are compiled from the RAVEL source program and stored in RAM 20 to provide the RAVE with sufficient data to implement its functions. A dynamically allocated synactor model table is the basis for these data structures and contains one or more synactor model table records 510, one for each synactor model which has been defined.

The first field in each synactor model table record 510 is the Owner field 501. This field contains the synactor model number (as defined in the RAVEL source), or a special code to indicate that this entry is empty (for table management). The next field, Reader 503, points (i.e., specifies the address where the reader table is located) to the reader table for that model. Reader tables consist of a header in which special codes are defined, followed by the rules, stored in compressed concatenated fashion. The next field, phocodes 505, specifies a pointer to the photable for this model. This photable is a lookup table which defines the narrator device characteristics of the synactor model in terms of its speech segment and other codes. Each code has its own record in the photable plus a filler record for phocode zero which is not assigned. The first field in that record specifies the number of bits in that particular narrator device code. The next fields list the bits that are used to define that code to the narrator device, and finally there is a zero terminator. The next entry in the synactor model table, Phocodes Count 507, is the number of records in the photable.

The next field in the synactor model table, Syncopations 509, points to the syncopations table, which describes the sounds necessary to sound out a word. This is a count off table containing one syncopation for each phocode plus a filler record for phocode zero. This count off table is delimited with a dedicated delimiter code after each syncopation string. The next field in the synactor model table, Syncopations Count 511, specifies how many bytes the syncopation table takes up. The Syncopations Count 511 is required for the synactor model table management routines in order to reallocate the table when a model is discarded. The next field in the synactor model table, Sequences 513, points to the sequences table. This is a count off table, counted off by phocode, having a filler entry for phocode zero, separated by a dedicated code, each entry of which specifies the positions and timing values as given for that phocode in the RAVEL source file. Each of the entries in the Sequences table consists of zero or more pairs of values. A zero-length "empty" entry in a count off table is denoted by concatenated separator codes. The first value in each pair is a position number that will index the positions table to find a pointer to a screen image or other synactor animation block (SABLOCK) data for that position; the second value is the time for which it is to be displayed on the screen (it may be displayed for a longer period if necessary to wait for an event). The next field in the synactor model table, Sequences Count 515 specifies the number of bits in the sequences table.

The next field in the synactor model table, Betweens 517, is a pointer to the inbetweens table. This is a linear list of records called inbetween records. Inbetweens are intermediate images which are displayed to smooth the transition between two images. Each has four associated values: The first position number, the second position number; the position number that is to be inserted between those two positions; the Time field for that inbetween, or zero to indicate a default to half the previous time in a synactor animation script (or to zero if the previous time is one cycle or less). This table is not indexed, it is sequentially scanned only. The next field in the synactor model table, Betweens Count 519, specifies the number of records in the inbetweens table. The next two fields, Width 521 and Height 523, specify how large the synactor image is to be on the screen. The next field, Model Flags 525, is used to indicate specialized modes of synactor animation.

The next field, Position Pointers 527, points to the positions table for this synactor model, which is indexed by the position numbers from the other tables to yield pointers to SABLOCKs. The first entry in the positions table is not used. Position number zero is illegal. The next entry, position number one, is dedicated for the initial "at rest" position. Additional position numbers are assigned arbitrarily by the programmer.

Figure 12:
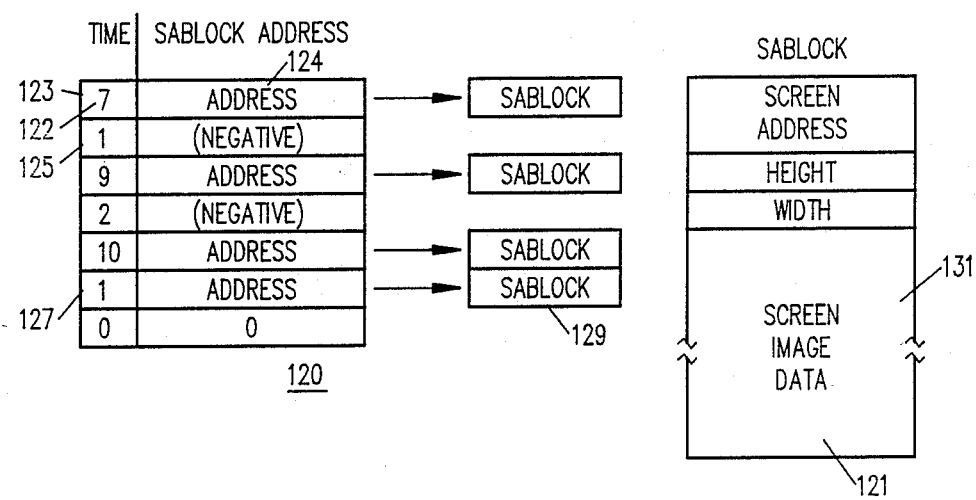
FIG. 12 is a diagrammatical representation of a synactor script.

SABLOCK data is animation means dependent data. In the preferred embodiment, the SABLOCK contains the data required to generate the screen image of a particular position of the synactor; for other embodiments, such as robotic means, the SABLOCK may contain commands to actuators or the like that would move various parts of the robot. FIG. 12 illustrates a sample synactor animation script 120 and SABLOCK 121. The other data structures above this point are animation means independent; and it is only here that outside world dependent data is specified. In addition to the synactor image, for purposes of input convenience, debugging and redundancy the first 32 lines of this SABLOCK image may include a human readable label and a position number (which would match the index into the position table that yielded a pointer to the SABLOCK).

The next value in the synactor model table, PhoFlags 529, points to a table of phocode attribute records indexed by phocode. In each record there is a bit that designates any phocode that is an event phocode; i.e., one for which feedback is available from the narrator device. There is another bit that will designate the phocode if it is an OPS (orthophonetically significant) phocode to be counted when creating and interpreting an OCREC, and a bit to designate whether the phocode is associated with stress and thus may influence adjacent phocode timing. There is a bit to indicate whether this phocode represents a vowel sound utilized in text to phonetic conversion methods for assignment of stress, prosody, etc., since knowing which phocodes are vowel sounds is necessary for syllabication in almost all languages. There is a bit to indicate a break (between sentences, phrases or other narrator device calling sequence string boundaries). A pause bit indicates a phocode which specifies to the narrator device when to pause; an associated numeric field specifies the number of cycles of pause.

The last field in the synactor model table, Characteristics 531, is a pointer to a block specifying the narrator device number for this synactor model, as given in the RAVEL source code, and narrator device dependent data. This would normally contain values for speed, pitch, volume and various other attributes peculiar to a particular narrator device in a format convenient to the audio processor.

Referring now also to FIG. 6, a sample RAVEL program fragment is listed. RAVEL provides a general method for a programmer to specify narrator device characteristics and provides for simultaneous use of two or more narrator devices. A RAVEL program specifies the behavior of a talking synactor's voice and associated images and how they relate to each other. RAVEL includes a general purpose phonology encoding method designed to function with any language. The rules for translation of character strings or text to phonetics are well known in the art and have been published by Elovitz et al: "Rules for Translation of Text to Phonetics", "IEEE Tranactions on Acoustics, Speech, and Signal Processing", December, 1976. The methods of Elovitz et al and other methods have been extended to perform the orthophonetic animation as well.

The first statement 601 in this code fragment is a comment statement. RAVEL accepts comments according to the C programming language convention delimited by "/*" at the beginning and "*/" at the end. The next statment 608, DEFINE READER 6\$ indicates to the RAVEL program that the definition of text-to-phonetics (and orthophonetics) translator method number 6 follows. It will be specified by the rules 603 (these are sometimes called productions) which follow statement 622, other indicators may also be required for certain non-English languages (not shown).

The backslash preceeding the dollar sign ($) in statement 608 is the character that will be used to delimit the end of the phonetic replacement string in each of those rules; the dollar sign is the character to be used in the rules to represent the space character and the beginning or the end of a string (this makes it easier to parse and insures adaptablilty with the phonetic codes utilized by other narrator device drivers).

The next statement 622, METHOD=ENGLISHNRL, specifies the method to be used in the text-to-phonetics translator. After another comment statement inserted for legibility, the rule statements 603 commence. The rules stated here are merely an example: a full set of rules for English runs to hundreds of statements, plus exceptions. Each exception is defined by its own rule statement, and custom orthophonetic rules to go with it. An example of an exception in this program is the rule 605 for the word "ONE". This example of English spelling irregularity is translated by the rule $[ONE]$=WAHN \; the $ insures a match only if it appears as a word by itself, (in a full set of rules there would be a later rule or rules to divert "ONE" occuring within a word). The coding information for the associated orthophonetic rule follow the text translation rule in each line. The first orthophonetic rule 607 is "1:(3 3 2)";1 is a special effect code which does not designate animation, it is dedicated instead for passing special information back to the calling program in the OCREC. Within the parentheses, the first two numbers indicate how many text characters are to be transformed into an associated number of OPS phocodes, respectively, in the case of an animation effect. The third value is a parameter that is passed back with the OCREC indicating that this is an exception word. Besides the special effect code 1, the second orthophonetic rule 609 states that effect 3 is to be generated, and that all three letters are to be displayed for any part of and for the whole word. No other effect is to be generated by this rule. This reflects a decision to indicate to the user that the word "ONE" cannot be decomposed into sounds that match the letters in any logical manner, "ONE" is just "WAHN". A different programmer may have divided differently, and written effect rules that indicated that the "O" of ONE made the sounds "W" and "AH", the "N" made the sound "N", and the "E" was silent. RAVEL source code orthophonetic rules empower the programmer to make these decisions, and have them be transferable to other host machines, rather than having them built-in with low-level programming.

The final rule 610 in the set: [$]=$ \ is used to pass space characters through into the phonetic translation unmodified. An orthophonetic effect code of 1 could be utilized here to flag the breaks between words if word-by-word orthophonetic animation rather than letter by letter were being done. A final backslash terminates this text-to-phonetics translator's rules section.

The next statement 611, MODEL 6, indicates to the RAVEL compiler that definitions of the phonology and image sequences used by model number 6 are to follow. The next statement 612, USE NARRATOR 6, specifies which narrator device to use for this model. The next statement 613 USE READER 6, specifies which text-to-phonetics translator to use for this model's narrator device. Definitions of the phonetic codes used by this model follow statement 613. Each of the numerals is a phonetic encoding character denoting the stress that will be placed on the syllable preceding that numeral. Since stress is primarily a matter of elongation of the vowel sound of a syllable (in English), these values are associated with timing numbers and the key word, stress preceding. The "#" 614 tells the compiler what to use as a syncopated speech form for that code when it is sounding out a word containing it. In this case "#" is the null string for this narrator device since stress values are unused in creating synchopated speech.

After definition of several punctuation marks 615, the RAVEL source code defines the vowel and consonant phocodes used 617. The vowel phocodes begin with "AA" 619, the short "o" sound of "cot". The syncopated speech form for it is identical. "AA" 619 is marked as a vowel sound, and also as an EVENT phocode to indicate that the Audio Script Processor 43 will be able to detect it when the narrator device begins pronouncing it, and will report to the Real-Time Coordinator 55 to trigger asynchronous animation. "AA" 619 is also marked as OPS, an orthophonetically significant phocode.

The next two numbers 621 in the "AA" 619 phocode indicate that this sound is to be associated with ten cycles of position number 2 from the image file denoted in the ENDMODEL statement 623 (shown in FIG. 6b) at the end of this language program fragment. Any number of images and associated timings can be associated with a sound segment in the language phocode; for example, the dipthong, "AW" 625 (sounds like "OW"), which like all dipthongs, is composed of two sounds run together in a characteristic way in the human language. It is being defined to produce two images: image 6 for five cycles, then image 48 for an additional five cycles.

The next statements 627 define consonants in which the syncopation string associated with them is not identical to the phonetic encoding string because these letter sounds are sounded out with a bit of a vowel during the syncopated speech mode. For example, "B" 626 is pronounced "BAX" (sounds like buh) instead of just "B". Another approach to syncopated speech sounds is shown for the letter "G" 629 where the leading underscore signals RAVEL to present a digitized sound read in from a file (the file name is GAX) and to synchronize it with faces and orthophonetics as if it were saying "GAX". The phonemes "K" and "S" 631 and 633 have been defined as not EVENT, just for purposes of example in this document.

Several reflex behaviors 635 of the synactor not associated with the production of sound are defined. The syncopation strings with them "SS #" 634 are merely fillers and the two character strings associated with each statement * *, *1, *2, *7 are simply otherwise unused phonetic encodings which denote reflex behaviors of the synactor invoked by its behavior controller 49 at appropriate moments. A semi-colon 636 ends the definition of this phonology. The SPECPARAMS statement 637 indicates standard screen area and functionality for the images.

Each INBETWEEN statement 639 has four numeric values associated with it. The first two specify between which positions an image should be inserted The third specifies which image to insert. The fourth parameter specifies the period of time to display that inbetween image on the screen. If the display time value is zero, the synactor script generator 54 will automatically use half of the preceding image's time (unless that preceding time was less than 2 cycles, in which case the inbetween won't be inserted). The display time allowed for an inbetween is always subtracted from the display time allowed for the previous image. For instance the first inbetween statement 638 specifies to the synactor script generator 54 that anytime the image numbered 33 is to be displayed on the screen followed immediately by the image numbered 5, the image number 65 is to be inserted between those two images for a duration of 3 cycles. In this instance the display time allowed for the image numbered 33 is reduced by 3 cycles to provide the display time for the inbetween image number 65.

In the inbetween statement 638 the value 33 corresponds to the position of the synactor lips and tongue for the sound associated with the phonetic code "T". The 5 is for the vowel sound denoted by the phonetic code "AO". (This is the "a" sound in the word "TALK".) Image number 65 displays the synactor mouth and face as it exists half way between those two positions. For example, in statement 640, in the position between 33 and 2, number 65 is also defined to be inserted between the "T" and another vowel, the "AA" sound of "COT" . This allows the use of that image over again because the between the "T" and another vowel, the "AA" sound of "COT". position of the lips displayed between "T" and "AA" and "T" and "AO" is nearly identical.

Inbetweens can be nested as well, as in statement 641 where an inbetween image numbered 74 is defined to be inserted between images 33 and 71. The way that image 33 gets next to 71 in the first place is when it is inserted as an inbetween between 33 and 1 in the previous statement 642. This nesting can be to any depth, and this methodology allows the RAVEL programmer to define a model of facial positions (or other images related to sounds) using a minimal number of stored images.

The final statement ENDMODEL 623, specifies to RAVEL that this particular model of a synactor's speech patterns and images is complete and specifies the name of the file where the images that this model refers to are to be found. Finally the single colon 643 denotes the end of the program.

Figure 7A:
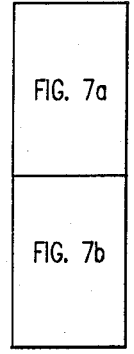
FIG. 7 is a table providing a sample listing of the code specifying the rules for the orthographic mapping of the tiles utilized as shown in FIGS. 2a-2r.

Referring now to FIG. 7, a sample program listing illustrating the statements which specify the orthography of the human language or other symbol set to be used with the tiles 29 is provided. Additionally, the code specifies how the tiles 29 (as shown in FIGS. 2a-2r) are to be positioned on the screen 27 and how the tiles 29 interact with other tiles and respond to user manipulation with the mouse or other input device, and the audio names to be associated with the letters or other symbols inscribed on the tiles 29.

The first statement 701, SPEAKER 6, identifies the particular narrator device that will be used to express letter names and syncopated sounds in this program. The next statement 703, LETTER NAMES indicates to the tile controller 37 that descriptions specifying the pronounciation of the names of the letters and other symbols inscribed on the tiles 29 are to follow.

The margins statement 705 specifies to the tile controller 37 the space to leave between the edges of the tile 29 and the letters or other symbols shown on it. The font statement 707 specifies to the tile controller 37 what the letters or symbols look like by referring to a font (not shown). Magnet range 709 specifies how close tiles need to be to attract each other. Squish factor 711 is an empirically derived value that is used to smooth animation of the tile 29 motions during fusion of the tiles. Scoot speed 713 specifies how fast the tiles 29 move under their own direction. Gap 715 specifies the space to leave between tiles 29 as a default when their locations are not specified. The tray statement 717 specifies the name of the tray and the location on the screen 27 at which that tray is to be drawn.

Each tile 29 is specified with a set of statements 719. For each tile 29, the tile controller 37 is told in which tray that tile resides and the location of the tile (after the "at" key word) in top left bottom right order. In this example the top is at location 30, the left coordinate is 35 and the first zero indicates that the tile controller 37 is to assign the bottom coordinate based on the margins and the font size given to that tile. The second zero for the right hand edge of the tile specifies that the tile controller 37 should use its margins and font information to determine how wide that tile should be.

The next line 721 says to display the letter "A" (or whatever is assigned to the character code for "A" in the specified font; the C programming language convention backslash "escape" code followed by a numerical value may be used instead to denote non-typable character codes) on this particular tile and the next line 723 indicates that an "AE" sound (short "a") is associated with this symbol. The keyword "WORDALSO" 724 will let the tile controller 37 know that there is also an English word spelled the same as this tile (in this case, the one-letter indefinite article "a") which may need to be pronounced differently than this tray tile that illustrates the normal mode associated sound sequence (otherwise a loose tile with the same text as a tray tile will use that tray tile's pronunciation sequence instead of trying to interpret and pronounce it as a word). The "PRESS" statement 725 identifies which key(s) on the keyboard need to be depressed in order to select that tile. Statements specifying tile color and shape may also be utilized.

The "C" tile statements 727 following statement 726 specify a digitized sequence for the sound of hard "C" ("K" sound). This is indicated to the narrator device by the leading underscore character 729 of the character string, which for this particular narrator device specifies "don't synthesize this phonetic string, but display the associated synactor lip movements for the phonetic string and play the sound file named 'KAH'. Presenting the hard sound of "C" as its normal sound rather than the soft "c" ("s" sound) is a programmer decision. A digitized or synthesized sequence which said "KAH OHR SS" (presenting both sounds and the word "or") could also have been used.

The tile controller 37 is a generalized system for managing and manipulating simulated letter-bearing tiles or other objects. Since all tile operations are controlled through the tile controller 37, the tile controller 37 is independent of the applications controller 44 and the RAVE. Associated with each tile 29 is a text string and an encoding of that text string representing the letter or symbol inscribed on that tile. These data structures are named tile records and are stored in a tile table in RAM 20.

Figure 8:
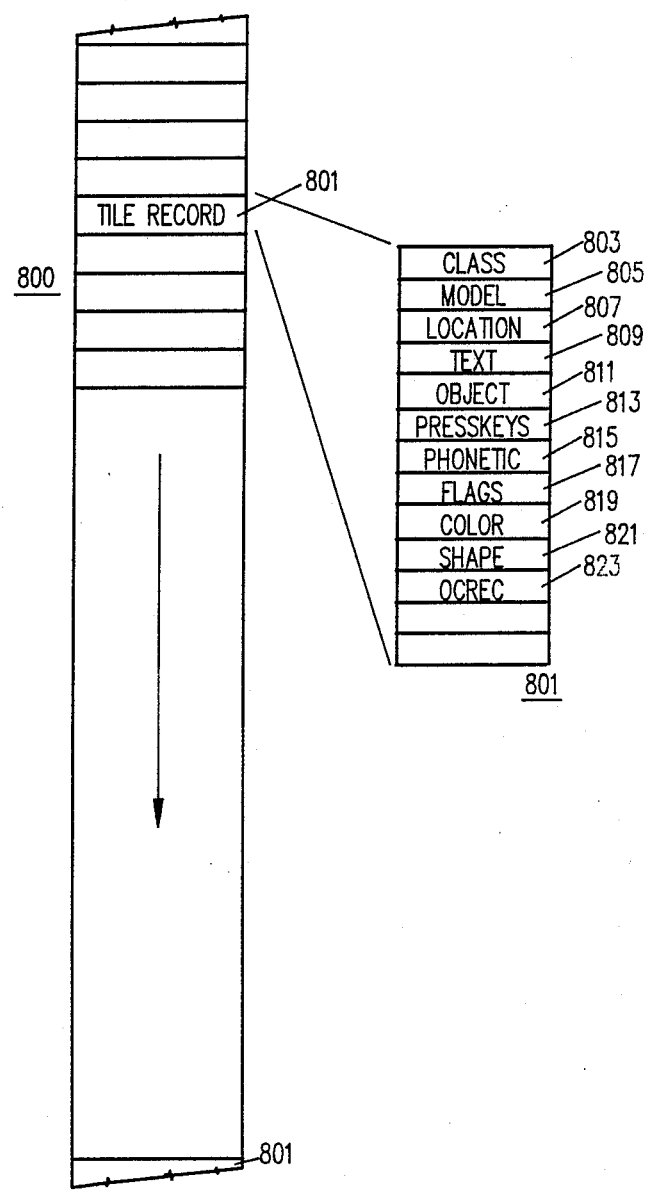
FIG. 8 is a diagrammatical representation of a tile table and associated tile records.

Referring now to FIG. 8, a tile record 801 is illustrated. The tile table 800 is a linear list of tile records 801 of fixed length; dynamic allocation (and copying) may be used to extend the tile table 800 length indefinitely. Most of the field content for each tile record 801 is usually defined by source code as shown in FIG. 7.

CLASS 803 specifies the class of tile. There are four classes of tiles. The tile table 800 marks empties with a special code for Class: Empty. Fixed tiles (which function as wells or stacks of tiles) stand at a particular place on the screen (except during edit mode, when the user can move them around and store their new configuration). Floating tiles are tiles which are being dragged around above the playing field, and loose tiles are tiles that have been dropped onto the playing field and can be moved around further. The fourth class is invisible, which may be used as a programming aid.

MODEL 805 specifies which model's voice and associated synactor animation is to be used with this tile.

LOCATION 807 specifies where on the screen the top left corner of the tile is located.

TEXT 809 specifies the address of a record containing orthographic character string data such as standard character string representations and the proper font to use.

OBJECT 811 specifies an address to an abstract representation of an object, if such is available in a particular operating system environment.

PRESSKEYS 813 contains a list of keyboard keys that are required to be depressed to select that particular tile from the keyboard.

PHOCODES 815 specifies a pointer to a string of phocodes that represents the pronunciation for the text string.

FLAGS 817 is used by the tile controller to store various temporary attributes of a tile. It also contains the "WONE" flag, indicating exceptional cases where a letter is also a one-letter word (or, more generally, when a symbol string inscribed on a tray tile is to be pronounced as a word when on a loose tile).

COLOR 819 specifies the color attributes of a tile, including the text color, background color and shading effects and art effects desired.

SHAPE 821 may designate optional characteristics such as more than one shape of tile to distinguish between various classes of letters; e.g., vowels and consonants.

OCREC 823 points to an orthographic correspondence record which gives information specifying the correspondence of parts of the text string to parts of the phocoded string and how they are to be animated.

The remaining fields are spares, reserved for future expansion.

Figure 10:
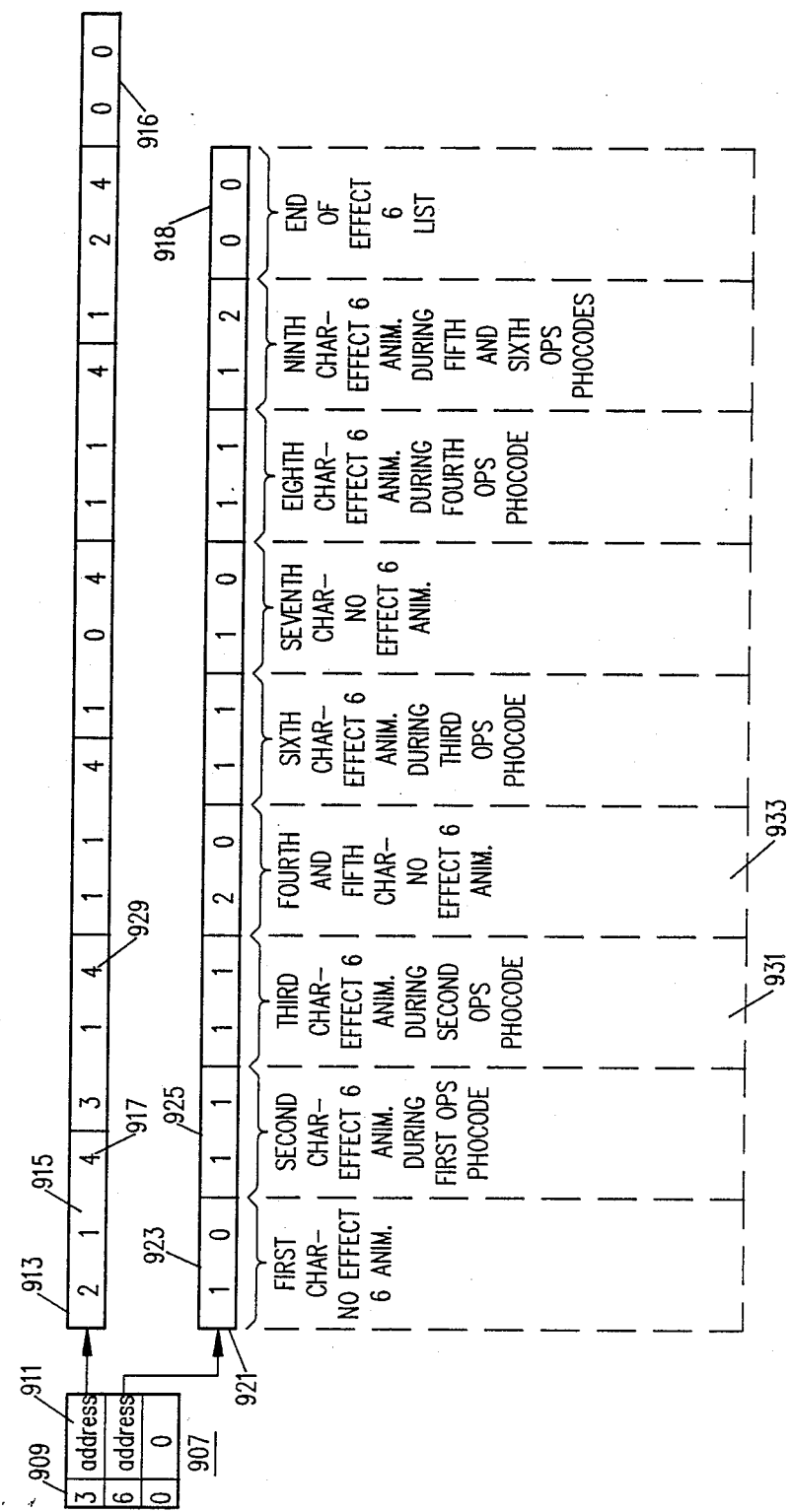
FIG. 10 is a diagrammatical representation of an orthophonetic correspondence record.

Referring now to FIGS. 9 and 10, a second example "KNIGHT AX" is translated to the phonetic string "NAYT AEKS" and the construction of the associated Orthophonetic Correspondence Record (OCREC) using the phonetic translation rules and the orthophonetic rules is shown. A sample listing of a RAVEL program (as shown in FIG. 6) has been described hereinabove. In this example, the effect 6—a dot above the letter—is used to indicate (highlight) in the display which letter or combination of letters is being pronounced; the effect 3—underline—is used to indicate important combinations of related letters.

Table 900 lists the rules 901 (taken from the RAVEL program sample of FIG. 6) used for this example including an explanation of the coding. The rules 901 are kept in character strings in a form easy for programmers to read and write. Each phonetic rule 903 has the form, a[b]c=d. The meaning is that the character string b, when preceded by an "a" and followed by a "c" is to be pronounced "d". The "d" consists of a string of phonemes or other speech segment codes peculiar to the specific narrator device for which the rules are written. "b" is a text fragment to be translated. "a" and "c" are patterns to be matched. Like "b", they may consist of literal text strings, but they may also be special symbols which denote classes of strings. The translation routine scans the source text, "KNIGHT AX" 902, sequentially. For each character in the source text that it scans, the translation routine searches through the rules given in the source code until it finds one whose left hand string (including context "a" and "c") matches the source text at the current position. The translation routine then outputs the phonetic codes on the right hand side of the equals sign of that rule up to but not including the backslash adding them to the phonetic translation string, "NAYT AX" 904, in progress. The translation routine skips over the bracketed characters in the source stream which it has matched, then applies the orthophonetic rules 905 following the backslash.

The orthophonetics portion 905 of the rules consists of any number of effect designators 906, separated by commas, terminated by a semicolon. Each effect designator 906 consists of the effect number, followed by a colon, followed by any number of parenthesized lists 908 of numbers. Each list 908 contains at least two numbers, the first of which indicates how many characters from the orthographic text input stream were translated and the second number indicates into how many orthophonetically significant (OPS) phocodes they were translated. Table 910 illustrates the animation 912 produced by the orthophonetic portion 905 of the rules 901 and the phonetic sounds 914 assigned by the phonetic portion 903 of the rules 901.

OCREC 907 is constructed as shown in FIG. 10 from these orthophonetic rules 905. It is a zero record terminated list which contains an effect code 909 and associated list address vector 911 for each effect 906 specified in the orthophonetic rules 905 applied to the source string. In this example 907, the effect code 909 is identical to the effect number 906 used in the orthophonetic rules 905. The address vector 911 points to a linear list 913 of the parenthetical codes 908 gathered for that effect and/or generated by the text-to-phonetics translator, terminated by two zeroes 916 (a forbidden and otherwise meaningless set of values).

Each record 915 in a list 913 contains at least two values, the first specifies the number of orthographic characters and the second specifies the number of orthophonetically significant phocodes (OPS phocodes) to which they were mapped. OPS phocodes are flagged in the RAVEL source code narrator device characteristics section (as shown in FIG. 6) and are used to exclude stress and other model phonetic codes for that particular narrator device which may have been inserted by the text-to-phonetics translator according to algorithms not covered by the translation rules. After outputting the orthophonetic rule effect parameters 908 (the numbers in the parentheses) to the end of each appropriate list 913, the routine resumes its scan of the source stream.

In some cases, effects may require a third value specifying the offset in the source string at which the animation is to occur, allowing animation of symbol set combination modes in which characters cause sounds to occur in an order different from the order in which the characters are arranged. Two additional values (not shown) are required to accomplish the phonics teaching mode (as shown in FIGS. 2l–2n) or other modes which emphasize the context (i.e., preceeding or following letter(s)) to cause a letter to have the particular sound that it has in that word. This is accomplished by modifying the text-to-phonetics translator method to keep track of the distance before or after the letter (or letter combination) it had to search to assign the proper phonetics to it. Separate effects codes may be used to exempt certain rules (usually those for exceptional cases) from these tallys in difficult spelling languages such as English.

Other effects may require additional values to specify overlapping elements of symbols (Oriental ideographic languages, for example), for denoting particular modes of that effect (width of underline, etc.) or for specifying synactor commentary to be associated with that rule ("this vowel is long because of that silent 'e'", for example).

For convenience and accuracy in coding orthophonetic rules, the text-to-phonetics translator may be programmed to generate default orthophonetic rules for values which can be inferred from the associated phonetics rule.

Referring now to the example, "KNIGHT AX", the first rule 919 in the sample RAVEL program to match the beginning of the text string "KNIGHT AX" is the rule, [$]KN =N \ (where the $ denotes a space character or beginning of a text string). This rule is designed to find and match the silent "K" before an "N" at the beginning of a word. This rule was matched first because the rules are scanned sequentially and the "normal K" rule below it was never examined. Once a match is found, the phonetic translation code "N" is output. The orthophonetic rules 905 associated with it contain the effect numbers 906 and associated effect values 908. The first numeral "3" indicates effect 3. To build an OCREC 907, the effect 3 designator 909 and the associated list address 911 are set up, then the effect 3 list 913 initial entries are entered by copying in the numeric codes "2 1 4" 908 enclosed within the parentheses after the "3:". The comma following the closing parentheses indicates that another effect 906 is to follow. Similarly for the next effect, effect 6, the effect 6 designator 909 and the associated list address 911 are set up. The initial entries are entered in the effect 6 list 921 by copying the two sets 908 of parenthesized codes following the "6", "1 0" and "1 1". The "1 0" 923 indicates that the first character, "K", was mapped to zero OPS phocodes. The "1 1" 925 indicates that the second character, "N", was mapped to a single OPS phocode. This completes the application of the first rule 919.

The rules are now searched for a rule to match the remainder of the source text string, "IGHT AX". The first match in the rules table for this string is the "IGH" rule 927. Applying it adds the "AY" code (long "i" sound) to the phonetic translation making the phonetic string "NAY". The "3 1 4" 908 following "3:" 906 in parentheses are added to the effect 3 list 913 under construction indicating that three orthographic source text string characters were mapped to one OPS phonetic phocode. The four 917, 929 in the effect 3 list is a further code which indicates that the width of the underline is to be four pixels.

The next two pairs 908 of values following the "6:" 906 are appended to the effect 6 list 921 under construction; a "1 1" and a "2 0" indicating that effect 6 (a dot over the letter when it is pronounced) is to be performed on the first character "I" but not the following two characters "GH" as explained in boxes 931 and 933 and illustrated in Table 910, row 935. Since the two characters "GH" are "silent" letters, they were not mapped to any phonetic translation.

The next rule to be matched is the "T" rule, and similarly as shown in the Table 900 until the OCREC is complete. Note that the rules 937 for "X" provide an example of a single letter 938 generating two phocodes 939. When the source text string is exhausted, the OCREC effect list 913 and 921 are terminated with zero pairs 916 and, 918, respectively. The OCREC lists 913, 921 are eventually used to generate the Orthophonetic Scripts.

Figure 11:
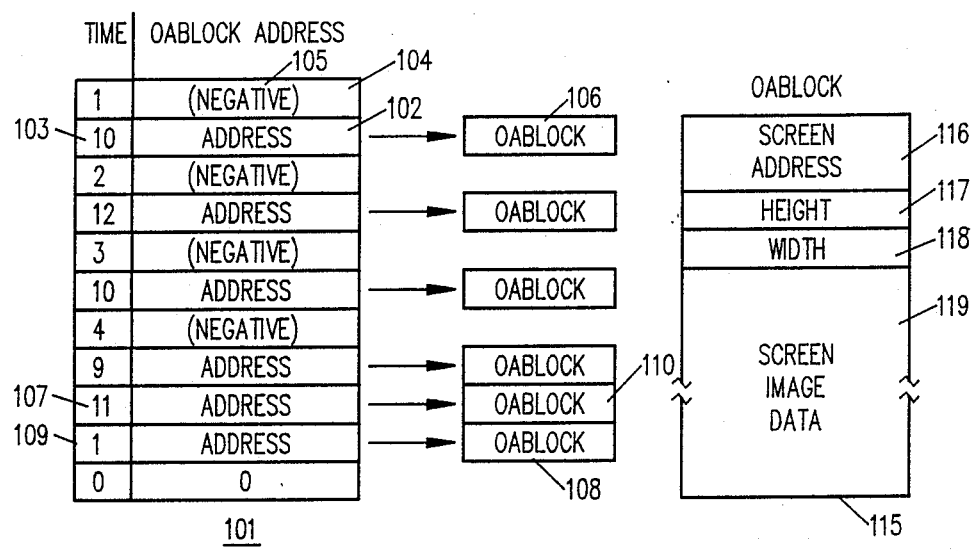
FIG. 11 is a diagrammatical representation of the orthophonetic script corresponding to the orthophonetic correspondence record shown in FIG. 10.

Referring now also to FIG. 11, an Orthophonetic Script 101 is illustrated. The Orthophonetic script is generated from the OCREC built by the text-to-phonetic translater 40 (as shown in FIG. 3) using rules in the RAVEL program.

One Orthophonetic Script 101 is usually generated for each effect list 913, 921, except for effect 1 and others reserved to flag special information. Each of the other effect lists, or sets of effects lists, in the OCREC 907 causes the microprocessor 10 to generate a script using the orthophonetic script generator 52. The orthophonetic script 101 is basically the same as a Synactor Script 120 (as shown in FIG. 12), consisting of Address-/time pairs 102, 103, plus wait-for-event records 104 flagged by negative address values 104 (shown as (NEGATIVE) in the Orthophonetic Script 101) and specifying the event number. For this example, the phocodes for "K" and "S" sounds have been flagged as not being event phocodes (as shown in FIG. 6).

In the orthophonetic script 101, the addresses 102 point to Orthophonetic Animation Blocks (OABLOCKS) 106, whose precise contents depend on the particulars of the effect (including what is the orthophonetic animation processor 51) and the nature of its script generator 52 (some information may have been compiled in during the non-realtime phase rather than passed as OABLOCK parameter values). In this example, "KNIGHT AX", the orthophonetic display is identical for both the "K" and the "S" and only one OABLOCK 110 is generated for both because they were generated by the phonetic translation of one letter "X". The display times for the "K" and the "S" are summed and the OABLOCK is displayed for a total period 107 of eleven cycles. The final OABLOCK 108 in the orthophonetic script has a display time 109 of one cycle and returns the screen to the initial unanimated (i.e., no highlighted letters) display. The OABLOCKS and the orthophonetic script generator 52 have been selected or generated by the microprocessor 10 based on the information passed to it from the application controller 31, the tile controller 37 or the behavior controller 49, which includes the text, the location on the screen for the orthographic image, and other text-drawing parameters required to specify the text completely. The microprocessor 10 thus can specify the height, width, and location of each orthographic character and utilize this data to generate the OABLOCKs during the non-real time phase.

OABLOCK 115 provides an example of an OABLOCK format suitable for most orthophonetic effects (and synactor effects) with a standard memory-mapped video display system. The OABLOCK 115 includes the screen address 116 at which to display the effect, the height 117 and width 118 of the displayed area and data 119 to specify the screen image itself.

Referring now to FIG. 12, an example Synactor Script 120 is shown. The Synactor Script 120 has the same format as the Orthophonetic Script 101 but the method of generation is different. The Synactor Script 120 shown is the script for the example "CAT" as described hereinabove. The first record 123 containing the display period 122 and a SABLOCK address 124 is for the phonetic coding "K". There is no "wait for event record" 125 preceding because "K" is not defined as an EVENT phocode (as shown in FIG. 6). SABLOCK 121 is formatted identically to the OABLOCK 115 but the screen image data 131 will describe a synactor position. The screen image data 131 may take the form of a digitized bitmap. Similar to the Orthophonetic Script 101, the last record 127 contains the address of the SABLOCK 129 containing the image of the synactor at rest.

I claim:

1. Apparatus for producing and displaying randomly-accessible animated objects having synchronized audio and visual features, said apparatus comprising:
   a program-controlled microprocessor;
   integrator means, coupled to the microprocessor, for producing signals representing encoded elements of sound and encoded elements of constituent object parts in response to command signals from the microprocessor;
   sound emitting means, coupled to the microprocessor and to the integrator means for producing sound in response to the signals representing encoded elements of sound; and
   display means coupled to the microprocessor, to the integrator means and sound emitting means for producing visual images of the animated objects in response to the signals representing encoded elements of constituent object parts, the visual images of the animated objects being synchronized with the sound.

2. Apparatus as in claim 1 further comprising input means coupled to the microprocessor for inputting program data to the microprocessor, said program data including audio and visual characteristics associated with a selected animated object.

3. Apparatus as in claim 2 wherein said animated objects include synthesized actors representative of real or imaginary persons, each synthesized actor being associated with a predetermined set of text-to-phonetic translation rules, said display means responsive to said signals representing encoded elements of constituent object parts for producing visual images of said synthesized actors lip-synchronized with the sound produced by said sound emitting means.

4. Apparatus as in claim 3 wherein said sound emitting means includes at least one narrator device, each narrator device responsive to a predetermined set of phonetic codes designating sound elements in a predetermined manner, said narrator device responsive to said signals representing encoded elements of sound and to said associated predetermined set of text-to-phonetic translation rules to provide the voice for an associated synthesized actor, each narrator device associated with at least one synthesized actor.

5. Apparatus as in claim 4 wherein said narrator device comprises audio processor means, a speech synthesizer and an audio output device.

6. Apparatus as in claim 1 wherein said integrator means includes translator means for translating a symbol set associated with said elements of sound into a phonetic representation of said symbol set and into a coded bit string representing orthophonetic characteristics corresponding to said elements of sound.

7. Apparatus as in claim 1 further comprising random access memory means for storing data representing said elements of sound, for storing data representing behavior traits associated with said elements of sound and for storing data representing visual images of said constituent object parts, the microprocessor and the display means responsive to said signals to access said data for generating anthropomorphic objects having behavior traits associated with said elements of sound.

8. Apparatus as in claim 7 wherein said data representing visual images of said constituent object parts includes data representating behavior traits of said animated objects not associated with speech.

9. Apparatus as in claim 7 wherein said data representing behavior traits associated with said elements of sound include data representative of articulations of lip and face parts associated with speech, said display means and said sound emitting means responsive to said data for generating said anthropomorphic objects having lip-synchronized speech.

10. Apparatus as in claim 9 wherein said animated objects include synthesized actors representative of real or imaginary persons, said display means and said sound emitting means responsive to said data for generating said synthesized actors having lip-synchronized speech.

11. Apparatus as in claim 1 further comprising:
animation means coupled to the integrator means, to the sound emitting means and to the display means, said animation means responsive to said signals for generating an encoded model of the animated object, the display means responsive to said encoded model to display the visual images of the animated objects.

12. Apparatus as in claim 11 wherein said animation means comprises:
first animation means responsive to said signals for generating a first digitized encoded model defining the characteristics of anthropomorphic objects; and
second animation means responsive to said signals for generating a second digitized encoded model defining the characteristics of physical objects.

13. Apparatus as in claim 12 wherein said anthropomorphic objects comprise animated cartoon characters having a person-like appearance.

14. Apparatus as in claim 12 wherein said physical objects comprise a plurality of domino-like tiles, each of said tiles having at least one symbol inscribed thereon, each of said symbols associated with at least one different speech sound.

15. Apparatus as in claim 12 wherein said first animation means is responsive to said signals for generating a second digitized encoded model defining the characteristics of a synthesized actor representative of a real or of an imaginary person.

16. Apparatus as in claim 15 wherein said display means includes time coordinating means coupled to said sound emitting means and to said first and second animation means for providing near synchronization between the display of visual images of said animated objects and said sound.

17. Apparatus as in claim 16 wherein said sound emitting means includes audio processor means for providing real time feedback to said time coordinating means responsive to said real time feedback for providing real time synchronization between said sound and the display of visual images of said animated objects.

18. A method for producing an displaying randomly-accessible animated objects having synchronized audio and visual features, said method comprising the steps of:
generating a set of first signals representing encoded elements of sound and encoded elements of constituent object parts;
generating a set of second signals in response to said set of first signals, said set of second signals representing images of animated objects composed of said constituent object parts;
electronically synthesizing a voice in response to said set of first signals pronouncing said elements of sound represented by said set of first signals; and
generating a video output and displaying the images of said animated objects represented by the said set of second signals, the display of said images of animated objects synchronized with said synthesized elements of sound.

19. The method of claim 8 including the step of generating a third set of signals defining the time coordination protocol between said synthesized voice and said images of animated objects for producing said synchronized display of said images of animated objects synchronized with said elements of sound.

20. The method of claim 19 wherein said third set of signals defines asynchronous time coordination between said synthesized voice and said images of animated objects for providing said synchronized display of said images of animated objects.

21. The method of claim 19 wherein the step of generating said third set of signals includes the step of generating a real time feedback signal for defining a synchronous time coordination between said synthesized voice and said images of animated objects synchronizing in real time the display of said images of animated objects with said synthesized voice.

22. A method for instruction for teaching language skills or the like comprising the steps of:
displaying a plurality of first animated images on a screen, each of said first animated images having at least one of a plurality of graphic symbols inscribed thereon, each of said plurality of symbols associated with speech sound;
receiving an input signal and selecting at least one of said first animated images in response to said input signal;
generating electronically a voice sound pronouncing the associated speech sound of the symbols inscribed on said selected one of said first animated images; and
displaying a second animated image on said screen, said second animated image including a talking head having facial features, said second animated image responsive to said input signal for displaying an animated sequence of body movements including movements of head and facial features simulating the speaking of said associated speech sound in synchrony with said voice sound.

23. The method of claim 22 wherein the step of receiving an input signal and selecting at least one of said first animated images includes the step of highlighting said selected first animated image to distinguish and emphasize said selected first animated image.

24. The method of claim 23 wherein the step of highlighting said selected first animated images includes accenting said symbol inscribed thereon simultaneously with generating said voice sound.

25. The method of claim 22 including the steps of moving said selected first animated image from a first location to a second location on said screen; and selecting at least one additional first animated image in response to at least one additional input signal and moving said additional selected first animated image to a third location adjacent said second location to form a combination of said symbols.

26. The method of claim 25 further including the steps of:

highlighting each of said selected first animated images simultaneously with the selection of each first animated images;

forming one first animated image at said second location by combining each selected additional first animated image with said first animated image at said second location when it is moved to said third location, said one first animated image having the symbols of each selected first animated image inscribed thereon;

pronouncing the associated speech sound in sequence of each of said symbols inscribed on said one first animated image and accenting each symbol simultaneously with the pronunciation of its associated speech sounds.

27. The method of claim 22 wherein the step of displaying a second animated image on said screen includes displaying said second animated image including animated hands for forming sign language hand symbols representing the associated speech sound of the graphic symbols inscribed on said selected one of said first animated images.

28. A system for producing animated orthographic objects in combination with at least one animated character having synchronized audio and visual characteristics associated with the orthographic objects, said system comprising:

a program-controlled microprocessor;

integrator means coupled to the microprocessor, responsive to command signals from the microprocessor for producing first signals representing encoded elements of sound and second signals representing encoded rules mapping said elements of sound to associated constituent object parts and behavior traits;

first animation means coupled to the integrator means and to the microprocessor, responsive to said first signals for generating a first encoded model representative of said animated orthographic object;

second animation means coupled to the integrator means and to the microprocessor responsive to said second signals for generating a second encoded model representative of said animated character;

sound emitting means, coupled to the microprocessor and to the integrator means for producing sound in response to said first signals representing encoded elements of sound; and display means coupled to the microprocessor and to the first and second animation means, said display means responsive to said first encoded model for producing and displaying visual images of said animated orthographic object, said display means responsive to said second encoded model for producing and displaying visual images of said animated character in synchrony with the sound.

29. A system as in claim 28 further comprising positioning means coupled to said display means responsive to input signals for repositioning said animated orthographic objects from one position to another position in said display.

30. A system as in claim 29 wherein said animated orthographic objects include a plurality of anagram images, each of said anagram images having at least one of a plurality of alphanumeric symbols displaced thereon, said positioning means responsive to said input signals for arranging at least one of said anagram images to selectively form desired combinations of at least one of said alphanumeric symbols, said sound emitting means responsive to said first signals representing encoded elements of sound producing sound associated with said desired combination of alphanumeric symbols, said display means responsive to said second encoded model for producing and displaying visual images of said animated characters in synchrony with said associated sound.

31. A system as in claim 30 further including phonic means coupled to said integrator means and to said sound emitting means responsive to said first signals for dividing said desired combination of alphanumeric symbols into its constituent phonic parts and providing a third set of signals respresentative of said constituent phonic parts, said sound emitting means responsive to said third set of signals for producing individual sounds associated with said constituent phonic parts, and said display means responsive to said third set of signals for highlighting the anagram image displaying the alphanumeric symbol or combination of alphanumeric symbols associated with an individual constituent phonic part synchronous with said associated sound.

32. A system as in claim 31 further including means responsive to said third set of signals for integrating said sounds associated with said individual constituent phonic parts to provide a smooth and continuous pronunciation of said desired combination of alphanumeric symbols, said display means responsive to said set of signals for successively highlighting each displayed alphanumeric symbol during that portion of said associated sound pronunciation in which its individual associated sound is most prominent.

33. A system as in claim 31 further including means responsive to said third set of signals for generating a fourth set of signals, said display means responsive to said fourth set of signals for selectively highlight adjacent displayed alphanumeric symbols which have an influence on the associated individual sound of an individual alphanumeric symbol or group of alphanumeric symbols when it is pronounced in combination with the sounds associated with said desired combination of alphanumeric symbols.

* * * * *